United States Patent [19]
Schmuck et al.

[11] Patent Number: 5,960,446
[45] Date of Patent: Sep. 28, 1999

[54] PARALLEL FILE SYSTEM AND METHOD WITH ALLOCATION MAP

[75] Inventors: Frank B. Schmuck, Campbell; Roger Lee Haskin, Morgan Hill, both of Calif.; Zvi Yosef Yehudai, Haifa, Israel; James Christopher Wyllie, Monte Sereno, Calif.

[73] Assignee: International Business Machines Corporation, Armonk, N.Y.

[21] Appl. No.: 08/893,880

[22] Filed: Jul. 11, 1997

[51] Int. Cl.⁶ ..................................................... G06F 17/30
[52] U.S. Cl. .............................. 707/205; 707/9; 707/101; 707/10
[58] Field of Search ................................ 707/3, 101, 205, 707/9, 10, 104

[56] References Cited

U.S. PATENT DOCUMENTS

| | | | |
|---|---|---|---|
| 4,274,139 | 6/1981 | Hodgkinson et al. | 395/200.33 |
| 5,043,876 | 8/1991 | Terry | 707/201 |
| 5,129,088 | 7/1992 | Auslander et al. | 395/700 |
| 5,202,971 | 4/1993 | Henson et al. | 707/8 |
| 5,226,159 | 7/1993 | Henson et al. | 707/8 |
| 5,375,233 | 12/1994 | Kimber et al. | 707/205 |
| 5,454,108 | 9/1995 | Devarakonda et al. | 395/674 |
| 5,463,736 | 10/1995 | Elko et al. | 395/868 |
| 5,490,270 | 2/1996 | Devarakonda et al. | 707/201 |
| 5,537,588 | 7/1996 | Englemann et al. | 707/205 |
| 5,566,297 | 10/1996 | Devarakonda et al. | 395/182.13 |
| 5,572,699 | 11/1996 | Kamo et al. | 395/441 |
| 5,675,769 | 10/1997 | Ruff et al. | 395/497.04 |
| 5,706,472 | 1/1998 | Ruff et al. | 395/497.04 |
| 5,774,715 | 6/1998 | Medany et al. | 707/101 |
| 5,784,646 | 7/1998 | Sawada | 395/858 |

OTHER PUBLICATIONS

"CMS Interactive File Sharing Prototype", by Eshel et al., IBM Research Division, T.J. Watson Research Center, Yorktown Heights, NY, RC13371 (#50869) Dec. 18, 1987.

"IBM VideoCharger Server for AIX", International Business Machines Corporation, Mar. 1997.

Custer, H., "Inside the Window NT File System," Microsoft Press, 1994, pp. 49–52.

Corbett et al., "Vesta Parallel File System," ACM Transactions on Computer Systems, vol. 14, No. 3, Aug. 1996, pp. 225–264.

Howard et al, Supporting Fundamentals for Microsoft Windows NT, Microsoft Press, pp. 152–163, 449–451, 1995.

*Primary Examiner*—Thomas G. Black
*Assistant Examiner*—Frantz Coby
*Attorney, Agent, or Firm*—Lynn L. Augspurger

[57] ABSTRACT

A computer system having a shared disk file system running on on multiple computers each having their own instance of an operating system and being coupled for parallel data sharing access to files residing on network attached shared disks. Methods are provided for use as a parallel file system in a shared disk environment by use of a scalable directory service for the system with a stable cursor, a segmented allocation map. Dynamic prefetch and cached balance pools for multiple accesses improve the system. Extended file attributes are used for implementation of Access Control Lists in a parallel file system. Improvement to caching and cache performance development balance pools for multiple accesses. A metadata node manages file metadata for parallel read and write actions. For our system, tokens are used for metadata node selection and identification, and we have enhanced token modes for controlling file size, as well as smart caching of byte range tokens using file access patterns and a byte range lock algorithm using a byte range token interface. Locking techniques reduce the overhead of a token manager which is also used in the file system recovery if a computer participating in the management of shared disks becomes unavailable or failed.

13 Claims, 1 Drawing Sheet

PARALLEL FILE SYSTEM AND METHOD WITH ALLOCATION MAP

FIELD OF THE INVENTION

This invention is related to computers and computer systems, and, in particular, to a file system running on multiple computers each having their own instance of an operating system and being coupled for data sharing with network attached shared disks, a shared disk file system.

GLOSSARY OF TERMS

While dictionary meanings are also implied by certain terms used here, the following glossary of some terms which relate to our invention may prove to be useful:

Data/ File system Data: These are arbitrary strings of bits which have meaning only in the context of a specific application.

File: A named string of bits which can be accessed by a computer application. A file has certain standard attributes, such as a length, a modification time and a time, of last access.

Metadata: These are the control structures created by the file system software to describe the structure of a file and the use of the disks which contain the file system. Specific types of metadata which apply to file systems of this type are:

Directories: these are control structures which associate a name with a set of data represented by an inode An inode contains the attributes of the file plus a series of pointers to areas of disk which contain the data which makes up this file. An inode may be supplemented by indirect blocks which supplement the inode with additional pointers if the file is large.

Allocation maps: these are control structures which indicate whether specific areas of the disk (or other control structures such as inodes) are in use or available. This allows software to effectively assign available blocks and inodes to new files.

Logs: This is a set of records used to keep the other types of metadata in sync in the case of failures. It contains single records which describe related updates to multiple structures.

File system: A software component which manages a defined set of disks providing access to data in ways prescribed by the set of Xopen and POSIX standards related to file data. The term is also used to describe the set of data and metadata contained within a specific set of disks.

Shared disk file system: A file system where multiple computers share in the management of a file system without assigning total management to a single entity. All of the computers are peers in that any may perform any role required to manage the data Specific roles may be assigned to specific computers as needed.

Shared disk attachment: This is a method of attaching disks to multiple computers with a protocol that makes the disks appear to be locally attached to each file system. The exact attachment protocol to each computer is not important to this work but includes various forms of network attached disks, switched disk attachment, or store and forward attachment. The key items are that it appears local to the file system and appears the same to all instances of the file system.

Quota: This is a function by which a file system limits the usage of a specific user or named group of users within the file system. For example, the administrator may limit user "John" to 100 megabytes of data within the file system. Quota is the function name used in the Unix (TM of S.C.O.) environment.

Access Control List: This is a file system technique by which a user can limit access to data to users who are named in a specific list.

BACKGROUND OF THE INVENTIONS

There is a need to supply file services to computers, such as a MPP machine and other clusters of computers, which form part of a network of attached computers which serve as a common computing resource.

We now have certain "open" (e.g. Xopen and POSIX) standards related to file data to a shared disk file system where computing jobs, which will execute on various computers, require access to the same file data as if the data was local to the computer executing the job (in order to run systems developed by IBM for different systems, see e.g. U.S. Pat. Nos. 4,274,139 and 5,202,971 and 5,226,159). When multiple computers are part of a network and multiple disks are part of the network, there is a need to create a shared disk file system which is compatible with the standards and yet requires no change in multiple instances of operating systems running on the computers, whether they be MMPs or clusters.

Shared File System (SFS) (see U.S. Pat. No. 5,043,876) is a term applied to IBM's S/390 systems which operate under IBM's VM for sharing data among virtual machines. Shared file systems also have been known as data sharing vehicles, such as IBM's IMS and GRS, where developed for a single-system environment, and under MVS GRS, was used in a cluster of systems sharing disk storage, and GRS in such a system could allocate small lock files on a shared disk in order to serialize access to data sets. MVS must serialize access to the table of contents on disks or to the catalog; what ever RESERVES operations are needed for the operating system to perform causes a good deal of system overhead.

IBM's DB2 has been adapted for data sharing in a Multiple Virtual Storage (MVS)/Enterprise Systems Architectures (ESA) environment by using IBM's coupling facility to create multisystem data sharing which requires a System/390 Parallel Sysplex environment because the coupling facility is needed to deliver highly efficient and scalable data sharing functions where the coupling facility manages connections between processors with a message path mechanism, as outlined in U.S. Pat. No. 5,463,736, essentially becoming the super-single server for the shared data.

Represented by what may be the best of breed for Audio/ Video file systems (IBM's VideoCharger Server for AIX), previous solutions dealing with computer systems which would allow standards compliance have relied on shipping file system level requests to a single server which acquires the data and returns it or shipping metadata requests from a client to a single server which allows the original computer to directly fetch the data. IBM also provides what is called the Virtual Shared Disk (VSD) program product which allows an SP2 user to configure nodes as primary and secondary IBM VSD server nodes. VSD software allows multiple nodes, running independent images of the operating system, to access a disk device physically attached only to one of the nodes as if the disk device were attached to all nodes, which IBM has implemented for the AIX operating system with a transparent switchover to a secondary server node when the primary server node for a set of virtual shared disks fails. In both cases, the existence of the single server is both a bottleneck and a potential failure point, even though there have been substantial advances made with such single server systems, like IBM's VideoCharger, as illustrated by U.S. Pat. No. 5,454,108's lock manager, U.S. Pat. Nos. 5,490,270 and 5,566,297's cluster arrangement. Also, as in International Business Machines' systems., there also exist capabilities for partitioning a disk accessed via a network so that a given computer manages and accesses a specific region of the shared disk and does not use the regions assigned to other computer(s).

However, these systems in the past have not provided any satisfactory solution permitting many computers which have a network access to multiple disks to permit any computer to have access to any data at any time, especially those which do not require a change in an operating system or standard, as we have developed and will described in the context of our shared disk file system. Nevertheless, we must recognize the work done by the inventors of the U.S. Pat. No. 5,454,108 for their advances, for we gave been able to use a modification of their lock manager as our advanced token manager in our own shared disk file system.

SUMMARY OF THE INVENTION

Our invention provides a shared disk file system where a file system instance on each machine has identical access to all of the disks coupled to and forming a part in the file system. This can occur using a gateway processor, a switched network, a high speed intranet coupling as would support TCP/IP, a nonuniform memory access bus couplings, or other similar connections. In accordance with our invention, the shared disk file system supports disk read and write calls with associated management calls. The operating instance is a commonly available standard and does not need to be changed to use our shared disk file system. We have provided new services needed to make our shared disk file system operate in a useful fashion.

Our shared file system operates as a parallel file system in a shared disk environment. We have provided a scalable directory service for the system with a stable cursor. We have provided a segmented allocation map. For our scalable parallel file system, we have made dynamic prefetch a reality. Speed in our scalable parallel file system has been improved by improving cache performance and space utilization. In addition, extended file attributes support access control lists, known as ACL's in the Unix world, which are, for the first time, operable in a parallel file system which is scalable in a shared disk environment.

The improvements which we have made achieve efficient basic file control in a shared disk environment for multiple computers sharing the disk and file environment. The directory service claims provide efficient insertion and deletion of files into data structures without major disruption to the data structures. This is critical in parallel systems where exclusive control must be obtained of regions to be modified.

Our allocation map development provides the ability to allocate storage from the same pool of disks in parallel while maintaining full consistency of the metadata. This is important because each of the computers with access to the file system will wish to create additional data without regard to what is going on in the other computers. Our prefetch algorithms calculate the available I/O bandwidth and the application needs for data to determine the amount of data to prefetch. This is important in parallel systems where the demand for I/O can exceed the available bandwidth. Our cache performance development balance pools of multiple accesses, and while not related to parallel processing, it is a general file system improvement. The use of file attributes as a supporting mechanism is also applicable to non-parallel file systems, but within our overall parallel file system mechanisms, it is very important because it allows an effective implementation of Access Control Lists in a parallel file system.

Allowing parallel update on the same file or directory in a shared disk environment is provided. We provide a metadata node for managing file metadata for parallel read and write actions. For our system, tokens are used for metadata node selection and identification, an we have enhanced token modes for controlling file size, as well as smart caching of byte range tokens using file access patterns and a byte range lock algorithm using a byte range token interface.

Parallel file updates required advances which revolve around the problem of how to effectively create and update metadata while updating the same file from multiple computers. One of our solutions is the creation of a metadata node which handles the merging of certain changeable metadata consistently from multiple originating computer applications. The second solution provides a locking scheme to effectively identify the computer to all which require its services. This avoids the need to create a fixed management point which might be a bottleneck.

Now, file size is a type of metadata which changes frequently in a parallel update situation. We have provided a method of getting the correct file size "just in time" when the executing application requires it. In addition we have redefined locking techniques for reducing the overhead of the token manager in this environment.

We have provided for file system recovery if a computer participating in the management of shared disks becomes unavailable, as may occur for many reasons, including system failure. We have provided a parallel file system recovery model and synchronous and asynchronous takeover of a metadata node.

Our parallel shared disk file system enables assignment of control of certain resources temporarily to a specific computer for modification. While this is the case, structures on the disk that are visible to other computers may be in an inconsistent state and must be corrected in the case of a failure. In order to handle this we have provided a method for extending standard logging and lock recovery to allow this recovery to occur while other computers continue to access most of the data on the file system. We have also provided for the handling of the failure of the metadata node. This development involves correction of metadata which was under modification and a new computer becoming the metadata node for that file, as described below.

Now, in the UNIX world the Quota concept is well known by that name. It is a generic concept able to be used to manage the initial extent of a space, and this concept is used with other operating systems, such as those of S/390 systems. Generically, when we consider quotas, they need to be managed aggressively so that locks are not constantly required to allocate new blocks on behalf of a user. We have provided recoverable local shares for Quota Management, as described below.

As a quota is a limit on the amount of disk that can be used by a user or group of users, in order to use the concept in our parallel file system, we have created a way for local shares to be distributed by a quota manager (which accesses the single quota file) for parallel allocation. This is crucial for those cases where a user has multiple application instances running on different computers sharing a file system. Our development provides for immediate recovery in many situations where sufficient quota exists at the time of the failure. In certain cases, running a utility, like the UNIX standard utility called "quotacheck", is required to complete the recovery. We have also developed a technique for running a quotacheck utility at the same time as applications using quotas with minimal interference.

These and other improvements are set forth in the following detailed description. For a better understanding of the invention with advantages and features, refer to the description and to the drawing.

DRAWING

FIG. 1 illustrates a shared file disk system in accordance with our invention which includes a token manager for nodes of the computer system.

DETAILED DESCRIPTION OF THE INVENTION

Figure 1:
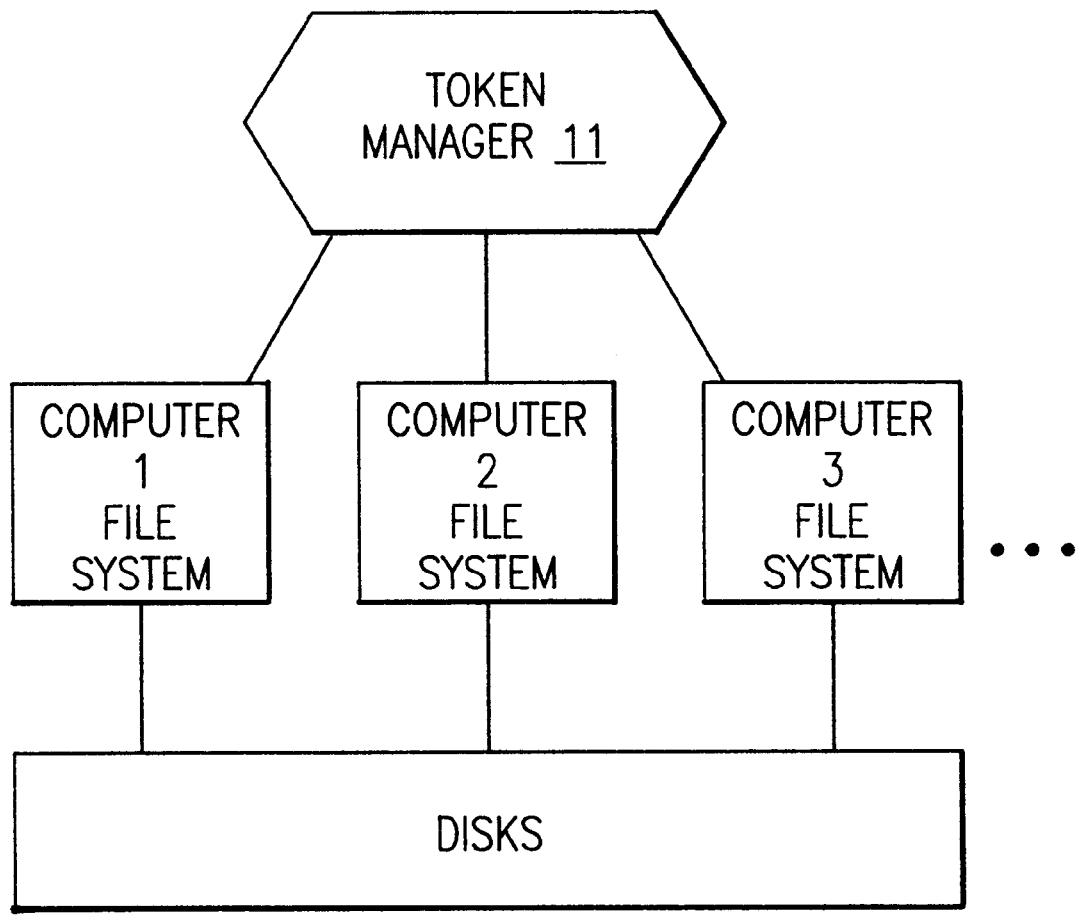

An example of our preferred embodiment of our shared disk file system implementation of several relevant components is illustrated in FIG. 1. Our system, as illustrated in FIG. 1, includes a token manager 11 which provides locking facilities for the computers which are considered nodes 1, 2, and 3 participating in the management of a file system. (N.B. For our token manager, we had to modify the lock manager of U.S. Pat. No. 5,454,108.)

Our file system code manages reads and writes requested by applications. This management uses the application requests and the commonly managed metadata to create and access data within the file system. This function is the bulk of the processing and is identical on all computers. With proper tokens, this processing directly accesses the disk through the disk read, write, and control functions.

The shared disk implementation, shown in FIG. 1 and described in general above, provides several major advantages over previous parallel and cluster file systems. It provides the shortest available path for moving the data from the disk to/from the using application. There is no file system server in the path for either data or metadata. Any available path can be used avoiding a server as a bottleneck or as a single point of failure. Since the required central functions in the lock manager have no attachment to a specific computer, they can be migrated from computer to computer to satisfy performance and availability needs.

In order to create the system we are describing, as we have noted, U.S. Pat. No. 5,454,108 showed a lock manager that we had modified to be able to handle different recovery paradigms needed for shared disk file systems and also to add additional lock states needed for the metanode processing required to allow parallel update of the same file. These specifics, along with others, are amplified below in the various subsections of this detailed description.

Scalable Directory Service with Stable Cursor and Extendible Hashing

For our shared disk file system implementation, we have developed a method for storing and indexing a large set of data records in a way that supports very fast insert, delete, and lookup operations, as well as a sequential retrieval ("scan") of all data records in an environment which can be implemented in any instance of an operating system, even a single one, in a manner which does not run afoul of existing interface programming standards, like X/Open's Single Unix specification. So, we will start with our sequential scan and the basic methods for storing and looking up data records. Unlike previously known indexing methods, our sequential scan produces predictable results using only a small, bounded amount of context information ("cursor") even if records are inserted or deleted while the scan is in progress. The method which we employ is in an area of technology referred to as extendible hashing. As implemented extendible hashing can use sparse files without storing an explicit hash table. Thus with utilization of extendible hashing we can implement directories in a Unix standard compliant file system, even though it is not so restricted. In general our preferred embodiment may be implemented with a Unix operating system environment, and that environment should be understood as a background, even though we contemplate other operating systems which use the same functions. Indeed, today, the base system can function with many operating system layers above the one actually employed in driving the machine which we call a computer.

Both database systems as well as general purpose file systems allow storing and retrieving data by specifying a "key" that identifies a data record or a file. In a general purpose file system the file name serves as the key for accessing the data stored in the file; the structure that stores a set of file names and associated file access information is commonly called a directory. When the set of data records or file names is large, an auxiliary data structure called an index is often used to speed up lookups. An index allows finding a record in a database table or a file name in a directory without scanning the whole database table or directory.

There are several well-known indexing methods based on hash tables as well as balanced search trees, such as AVT trees and B-trees. To achieve good lookup performance, these methods require reorganizing at least part of the index after inserting or deleting some number of data records. For example, inserting a record in a B-tree may require splitting a B-tree node into two new nodes to make room for the new record. As a result, existing records may need to be moved to a different physical location.

This present a problem for applications that need to sequentially scan a data base table or a file system directory, e.g., to list the contents of a directory. Such applications make repeated calls to the data base or file system, retrieving one or more records in each call, until all records or directory entries have been retrieved. Between calls, a certain amount of context information, often called a "cursor", must be maintained to keep track of how far the scan has progressed. This is necessary so that the next call can continue retrieving the remaining records. Implementations of file system directories typically use the physical location or offset of an entry within a directory as a cursor for a sequential scan. Since an index update, such as a B-tree split, may move existing entries to a different location within the directory, inserting or deleting directory entries during a sequential scan will have undesired effects on the result of the scan: if an existing entry is moved, the sequential scan could miss the entry or it could return the same entry twice.

To solve this problem with previously known indexing methods, one could either keep the index separate from the data records, or save more context information during a scan. The former approach makes lookup, insert, and delete operations more expensive and considerably more complex due to the extra level of indirection required than our preferred approach. The latter saving of context information method is not applicable where the system needs to be compatible with existing programming interface standards.

For example, the directory interface defined in the X/Open Single Unix Specification (readdir, telldir, and seekdir functions) allows only a single 32 bit value as a cursor for a sequential directory scan.

With our preferred development utilizing extensible hashing, we can demonstrate how a large set of data records can be stored and indexed in a way that supports very fast insert, delete, and lookup operations, as well as a sequential scan. Furthermore, one will appreciate with our preferred development that a small, bounded cursor value (typically 32 bit) is sufficient to guarantee that a sequential scan will return no duplicate records and retrieve all existing records, i.e., all records except for those that were inserted or deleted while the scan was in progress.

Now, it is well known that hashing is a technique for storing and looking up data records by key that works well if an approximate bound on the number of records is known in advance. Hashing works by dividing the available storage space into a fixed number of "hash buckets". To store a record, a mapping known as a "hash function" is applied that maps the key value to a hash bucket number; the new record is stored in the hash rocket given by the hash value. To find a record by key, its hash value is computed; the requested record can then be found by scanning only the records stored in the bucket given by the hash value.

In general, the number of key values to be stored will not be known in advance and may grow arbitrarily large. This presents problems for the standard hashing technique, which requires that the maximum number of hash buckets he known from the start. An advanced form of hashing algorithm known as "extendible hashing" solves this problem by using a variable number of bits from the value of the hash function. When a hash bucket fills, it is "split", i.e., a new hash bucket is added and, and some of the records are moved from the existing hash bucket into the new one. Which records are moved is determined by re-evaluating the hash function and using one more bit to determine the hash bucket number: records where the additional bit is zero stay in the existing bucket, those with a one value for the additional bit are moved to the new bucket.

Using our preferred embodiment which uses extendible hashing, an index or directory starts out with a single bash bucket, bucket number zero. As long as they fit, all records go into the initial bucket regardless of hash value, i.e., zero bits of the hash function are used to determine the hash bucket number. When the initial bucket is full, it is split by adding a new hash bucket, bucket number one. Now one bit of the hash function is used to place records: those records with a zero in the least significant bit of the hash value stay in bucket zero, those records where the least significant bit is one are moved into hash bucket one. New records are added to buffet zero or one depending on the value of the least significant bit of the hash value. Now assume, for example, that hash bucket one fills up again and needs to be split. The two last bits of the hash function are now used to determine where the records from bucket one will be placed. Those records with bit values 01 stay in hash bucket one, those with bit values 11 go into a new hash bucket with bucket number three (binary 11=decimal 3). The records in hash bucket zero are not affected by the split, i.e., records with the last, two bits 00 or 10 remain in bucket zero until bucket zero fills and needs to be split as well. It is also possible that bucket one fills up and needs to be split again before bucket zero is ever split.

The directory structure after several hash bucket splits can be represented by a binary tree ("hash tree"), as shown in the example in Table 1. A record can be found by traversing the tree from the root to a leaf node (hash bucket) using the hash value bits to decide which branch to follow at each inner node. Depending on the distribution of hash values, one branch of the hash tree may be become longer than others. For a well chosen hash function, i.e., a function that generates evenly distributed hash values, we expect all tree branches to have approximately the same depth. A sequential directory scan is accomplished by a depth-first tree traversal, which will visit the leaf nodes (hash buckets) in left-to-right order.

TABLE 1

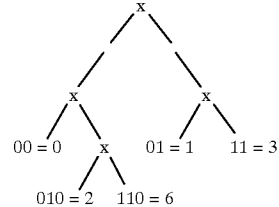

Table 1:
Example of a hash tree after 4 splits:

bucket 0 was split into bucket 0 and bucket 1,
bucket 0 was split again into bucket 0 and bucket 2,
bucket 2 was split again into bucket 2 and bucket 6,
bucket 1 was split again into bucket 1 and bucket 3.
The leaf nodes of the tree are labeled with the hash bucket number in binary and decimal.

In accordance with our preferred embodiment a hash tree is represented as a sparse file on disk, and records are relocated when a hash bucket is split, and a sequential directory scan traverses the hash tree in such a way that all existing entries are returned exactly once. Each of these areas of development have provided improvements applicable to our system.

In our system sparse files are used in implementing extendible hashing. In a file system, data written to a regular file is stored in one or more disk blocks on disk. Unix and Unix-like file system interfaces allow writing new data past the current end of a file by issuing "seek" calls between write calls. This allows creating files with gaps or "holes", i.e., areas within a file to which no data was ever written. Such files are referred to as "sparse files". Read operations on sparse files return zeros where the read offset and length intersect a hole. File system implementations that support sparse files efficiently allocate disk storage only for the areas of a file to which data was written, but not for holes, or at least not for holes that are larger than the block size or the unit of disk allocation used by the file system.

An index or directory based on extendible hashing is implemented using a sparse file in our preferred embodiment. Each hash bucket is stored in the file at an offset given as is. where i is the hash bucket number (starting with zero) and s is the hash bucket size (all hash buckets have the same size). The directory starts out as an empty file. When the first record is inserted, it is stored in hash bucket zero, which is subsequently written to the file, increasing the file size from zero to s. When hash bucket zero needs to be split, bucket 1 is written increasing the file size from s to 2*s. The next hash bucket split will write bash bucket 2 or 3, depending on which of the first two buckets needs to be split next. If bucket one is split next, hash bucket number 3 will be written, increasing the file size from 2*s to 4*s, leaving the file with a hole at offset 2*s, where hash bucket 2 would go. Table 2 shows how the hash tree in the example from Table 1 would be stored in a sparse file.

TABLE 2

| bucket 0 | bucket 1 | bucket 2 | bucket 3 | hole | hole | bucket 6 |
|----------|----------|----------|----------|------|------|----------|

Table 2:
Hash tree from Table 1 mapped into a sparse file.

As described above, a record with a given key could be found by traversing the hash tree top down starting at the root (bucket zero). However, since we expect all tree branches to have approximately the same depth, it is more efficient to traverse the tree bottom up. This is done as follows. Given the file size, we can compute the depth of the longest hash tree branch, because, in a hash tree with maximum depth d, all hash bucket numbers are d bits or less and at least one hash bucket must have a bucket number where the d'th bit is one. Therefore, the maximum depth d can be computed as the number of bits in the largest hash bucket number, which is given by f/s−1, where f is the file size. To look up a record with a given key, we first compute the hash bucket number b given by the d least significant bits of the hash value for the given key. If all branches of the hash tree had the same depth, we would be assured of finding the record in the hash bucket given by that key. Since the branch that stores the given key may have depth less than d, bucket b might not yet exist in the hash tree. If this is the case, the file will have a hole at the offset given by b*s. Therefore, if a hole is found, we compute a new hash bucket number b' by using one fewer bit of the hash value, which will yield the location of the record if the hash tree branch had depth d−1. This procedure is repeated as long as it encounters a hole in the file. Once a non-hole is found, the record with the given key must be in that hash bucket, if it exists. Lookup and insert operations are handled as follows:

Lookup Operation

1. Compute the hash value h of the key being looked up.
2. Compute hash tree depth d as log-base-2 of the file size divided by hash bucket size, rounded up to the next integer.
3. Compute hash bucket number b as the d least significant bits of h:

$b = h \mod (2\neg d)$

4. Retrieve the hash bucket from the file at offset b*s, where s is the hash bucket size.
5. If hash bucket b does not exist (the file contains a hole at offset) decrement d by one and go back to step 3.
6. Look for the record with the specified key in hash bucket b; if found, return the record; else return "not found" error.

Insert Operation

1. Compute the hash depth d and hash bucket number b as described in steps 1 through 5 for lookup, using the key of the record to be inserted.
2. If a record with the given key already exists in hash bucket b, return "already exists" error.
3. If there is enough room in hash bucket b for the new record, store the record and return. Otherwise, hash bucket b must be split to make room for the new record as described in the steps below.
4. Compute b'=2¬d+b
5. For all records in hash bucket b, repeat the following steps:

5a. Compute V=h mod (2¬(d+1)), where h is the hash value for the key of the record. Note that v must be equal to either b or b', because h mod 2¬d is equal to b for all records in hash bucket b.
   5b. If v=b', move the record to hash bucket b'; else leave the record in h.
6. Increment d by one and recompute b as h mod (2¬d), where h is the key of the record to be inserted. Go back to step 3.

Although the extendible hashing implementation described here works with any hash bucket size, it will be more efficient if the bucket size is the same as the file system block size or a multiple of the block size. This is because an efficient implementation of sparse files does not require any disk I/O to read a hole if the hole is aligned on file system block boundaries. Hence, all lookups require at most one disk I/O to read the actual hash bucket that would hold the record if that hash bucket is not currently cached. Note that this assumes that the file metadata that contains the location of the file's disk blocks is cached.

For evenly distributed hash values, we expect to encounter 0.5 holes per lookup on average. If the extendible hashing implementation has direct access to the file system metadata (e.g., if it is used to implement directories in the file system itself), holes can be recognized by consulting the file metadata directly. Otherwise, lookup must read at least some data for each hash bucket number it computes and recognize a hole by the fact that the read returned all zeroes. This is most easily done by storing hash buckets with a short header that contains a non-zero value.

Now we provide for splits and merges of hash buckets. Records are stored within each hash bucket, and they are moved when a hash bucket is split. Disk space is reclaimed by merging hash buckets after deleting records.

Each hash bucket contains a header with a "hash tree level" field. The value of this field indicates the level of the hash bucket within the hash tree, i.e., how far the bucket is removed from the root of the hash tree. Initially, the tree has only one bucket, bucket zero at hash tree level zero. When bucket zero is split, its hash tree level changes from zero to one; the new bucket number one is a sibling of bucket zero after the split, i.e., it will have hash tree level one as well. Each time a hash bucket is split, level is increased by one, and the new bucket that is added is assigned the same hash tree level as the one that was split.

Whenever a new record is added to a hash bucket, we store together with the record, the hash tree level of the hash bucket at that time. When the hash bucket is split, the hash tree level stored in the bucket header is incremented, but the hash tree level stored with each record is left unchanged. The records that are moved to the new hash bucket keep their original hash tree level values as well. Thus, by comparing the hash tree level values associated with a particular record with the hash tree level stored in the hash bucket header, it is possible to determine whether the record was inserted before or after the bucket was last split. This ability is required by the sequential directory scan, as will be explained further below.

Another requirement of the sequential scan is that the offset of a record within a hash bucket remains stable once the record has been inserted. Therefore, when we insert or delete a record in a hash bucket, existing records are left at their original location, i.e., there is no free-space compaction. Furthermore, when a record is moved to a new hash bucket due to a split, we store the record in the new bucket at the same relative offset as in the original hash bucket. This, together with the hash tree levels, allows reconstructing the content of a hash bucket before it was split.

After some number of delete operations, it may be desirable to reclaim disk space that is no longer needed. This can be done by merging two sibling leaf nodes in the hash tree if the two nodes have few enough records to fit in a single hash bucket. However, the sequential scan requires preserving record offsets during merges as well as during splits. This means that in order to determine whether two hash buckets can be merged, it is not sufficient to simply add up the free space in both buckets; instead, it is necessary to verify that there are no two records that would overlap when merged into a single hash bucket. The easiest way to accomplish this is to defer merging two hash buckets until one of the two has become completely empty.

When two hash buckets are merged, records from the one with the higher bucket number are moved to the one with the lower bucket number, and the hash tree level in the header of the lower numbered bucket is decremented by one. The hash bucket with the higher hash bucket value is removed from the file by clearing its content. In a Unix-like file system this can be done by calling fclear; if the file system implements sparse files efficiently, this will create a hole by deallocating the disk storage previously occupied by the hash bucket.

In our preferred embodiment in order to support a sequential scan of all records in a directory or index, a scan operation is provided that can be invoked repeatedly to return the contents of the hash tree, something we call a sequential directory scan. Each call returns one or more records plus a "cursor" value that must be passed to the next scan call in order to retrieve the next set of records. We will first describe how this directory scan works if no records are inserted or deleted while the scan is in progress and then consider how to handle hash tree changes due to inserts or deletes between calls to the scan routine.

The directory scan starts by retrieving records from the left-most hash bucket in the hash tree, which is always hash bucket number zero. Once all records from bucket zero have been returned, the scan continues to the sibling of hash bucket zero in the hash tree. Due to the way the hash tree is constructed, the hash bucket numbers of two siblings at depth d in the hash tree differ only in the d'th bit: the left sibling has a zero and the right sibling has a one at the d'th bit of the hash bucket number. Hence the sibling of hash bucket zero is hash bucket $b1=2\text{-}(d-1)$ (single one bit at the d'th position). After retrieving all records from hash bucket b1, the scan continues to the next hash bucket in the hash tree in a depth first tree traversal order. The next hash bucket after bucket b1 is not a sibling, but shares a common ancestor with hash bucket b1 at a depth of d-1 in the tree. Hence this next hash bucket will have a 1 bit at bit position d-1 and a zero bit at position d, yielding a hash bucket number $b2=2\text{-}(d-2)$. In general, given a hash bucket b at depth d in the hash tree, the next leaf node in depth first tree traversal order is found by taking the d least significant bits of b, reversing those bits, adding one modulo $2\text{-}d$ to the resulting value, and reversing the result again.

A hash tree scan can therefore be implemented using a cursor $c=(b,r)$ that consists of a hash bucket number b and a relative offset r within a hash bucket. A scan operation invoked with a cursor value (b,r) first checks whether there are any more records at an offset greater than or equal to r in hash bucket b. If so, the scan returns the next, record after r and a new cursor value (b,r'), where r' is the next offset after the record that was returned. If there are no more records at offsets greater than or equal to r in bucket b, the scan continues with a cursor value of (b',0), where b' is the next hash bucket number computed, using the bit-reverse/ increment procedure described above, with a value of d that is given by the hash tree level stored in the header of bucket b. If this calculation yields a value of 0 for b', we have reached the end of the hash tree, and there are no more records to be returned.

Hash tree changes due to inserts or deletes are handled in between calls to the scan routine. Since we do not move existing records within a block to insert a new record or to delete an old record, the sequential scan is not affected by inserts and deletes as long as they do not result in a hash bucket split or merge. Since existing records do not move in this case, the scan will find each record at most once and is guaranteed to return all existing records, except for those that are deleted while the scan is in progress. A newly inserted or deleted record may or may not be found depending on the position of the record (hash bucket and offset) and the timing of the insert/delete relative to the hash tree traversal by the sequential scan. A hash bucket split or merge does not affect the sequential scan either if the split/merge happens before the sequential scan reaches the hash buckets affected by the split/merge or if it happens after the scan has proceeded past the affected buckets.

Special consideration is required only if a hash bucket is split or merged when the sequential scan has returned some but not ill of the records in the hash bucket affected by the split or merge. When a block is split, some of the records that had already been returned by previous calls to the scan routine could be moved into the new hash bucket where the sequential scan would return the same records again when it visits the new block. Conversely, a hash bucket merge could cause the scan to miss records that are moved from a block that had not yet been visited by the scan into the current hash bucket at an offset smaller than the one given by the current scan cursor value. This invention solves these problems by detecting a split or merge of a hash bucket that would affect the sequential scan, and by reconstructing the state of the hash bucket before the split/merge when necessary in order to continue the scan without missing or duplicating records. Detecting a split or merge is accomplished by including a hash tree level in the cursor value returned by the scan routine as follows. When the scan routine returns the first record from a hash bucket b, it returns a cursor value $c=(h,b,r)$ containing the hash bucket number b and relative offset, as described above, as well as the hash tree level value h found in the header of the hash bucket at the time the first record is read. When this cursor value is passed to a subsequent call to the scan routine, the hash tree level h given by the cursor value is compared to the current hash tree level h' found in the header of the hash bucket. If h'>h, then hash bucket b must have been split between the two calls to to the scan routine; if h'<h or if hash bucket b no longer exists (the file now contains a hole at offset b*s), it must have been merged.

Hash bucket splits (h'>h) are handled by reconstructing the hash bucket as it existed when the cursor was generated. A temporary buffer is used to hold the reconstructed hash bucket. Descendants of the original hash bucket are read one at a time, and any records that existed in the original hash bucket b are copied into the temporary buffer. The records to be copied are identified by examining the hash tree level stored together with each record as described in the previous section: all records with a hash tree level less than or equal to h already existed before hash bucket b was split and are therefore copied. Since a hash bucket split retains the original offset of the records it moves into a new hash bucket, we are assured that these records can be copied back at the same offset in the temporary buffer, so the temporary buffer will look just like the original one did when the cursor was generated except for records that have since been deleted). The scan routine then continues processing using the reconstructed block in the temporary buffer. When it reaches the end of the temporary buffer, the scan routine computes the next hash bucket to visit using the bit-reverse/increment procedure described above with a value of d that is given by the hash tree level h from the scan cursor.

Finally, hash bucket merges are handled during a sequential scan. A merge is detected if the hash level h given by the scan cursor c=(h,b,r) is larger than the hash level h' found in the header of hash bucket b or if hash bucket b no longer exists, i.e., a hole was found instead. Similar to the merge case, this is done by reconstructing the hash buckets as they existed at the time the cursor was generated, i.e., before they were split. In this case, however, it is not necessary to reconstruct previous hash bucket content in a separate buffer. Instead, the scan operates on the merged hash bucket, but makes multiple passes over the bucket. In each pass only records from one of the original buckets are returned; other records are ignored. This is done by recomputing the hash value of each record and comparing the h least significant bits of the hash value with the hash bucket number b given by the current scan cursor. If they are equal, the record would have been placed in hash bucket b before it was merged, and the record will be returned by the scan. Otherwise, the record will be ignored. Note that if hash bucket b no longer exists (a hole was found instead), the bucket containing the result of the hash bucket merge is found by going up one or more levels in the hash tree until a non-hole is found (similar to a lookup) When the scan reaches the end of one pass over the merged hash bucket, it computes the next hash bucket number b' according to the bit-reverse/increment procedure described above with a value of d that is given by the hash tree level h from the scan cursor. If the new bucket b' is another descendent of the merged hash bucket, this will start the next pass over the merged bucket with the new cursor value c'=(h,b',0). Otherwise, the last pass over the merged bucket has been completed, and the scan continues normally with hash bucket b' and a cursor value c'=(h",b',0), where h" is the hash three level found in the header of bucket b'.

A programmer can implement the method we describe in any language which can implement the algorithm for the scan operation summarized below:

Input: cursor value c=(h,b,r) buffer for returning one or more records

Output: records returned in the provided buffer new cursor value

Note: on the first call to the scan routine, a cursor value of (0,0,0) should he passed in; On subsequent calls, the cursor value returned by the previous call should be passed to the next scan call.

1. Set h'=h, b'=b
2. Read hash bucket b' from the file at offset b'*s, where s is the hash bucket size. If hash bucket b' does not exist (the file contains a hole at offset b'*s, decrement h' by one, recompute b' as b' mod 2¬h', and go back to the beginning of Step 2.
3. Set h' to be the hash tree level found in the header of hash bucket. If h, b, and r are all zero (start of the scan) set h to the same value as h'.
4. Compare h' to h. Depending on the result of the comparison, continue with step 5, 6, or 7, as indicated below:

5. If h'=h:
   Note that in this case b must be equal to b'.
   5.1 In hash bucket b search for the next record at an offset greater than or equal to r. Depending on whether there still is such a record, continue with step 5.2 or 5.3, as indicated below
   5.2 If such a record exists:
      Check if there is still space in the buffer provided to return the record. If there is, copy the record into the provided buffer, update the offset r in the scan cursor to be the next offset after the record that was just copied, and then go back to step 4.
      If there is no more space in the buffer provided, exit from the scan routine, returning the current cursor value.
   5.3 If no such record exists:
      Compute b" to be the next hash bucket in depth first order: b"=reverse(reverse(b, h)+1, h) where reverse (x,n) means taking the n least significant bits of x and reversing them.
      If b" is equal to zero, we have reached the end of the scan. In this case, exit from the scan routine, returning the current cursor value.
      Otherwise, update the cursor c=(h,b,r) as follows: Set b and b' equal to b". Set r to zero. Read the hash bucket given by the new value of b and set h and h' to be the hash tree level found in the header of the hash bucket. Then go back to step 4.
6. If h'>h:
   This case means hash bucket b was split.
   6.1 If not yet done, reconstruct the content of hash bucket b as it existed before the split, by merging all descendents of hash bucket b in the hash tree into a temporary buffer. This may already have been done for bucket b in a previous iteration; in this case, this step can be skipped.
   6.2 Find the next record in the temporary buffer at offset greater than or equal to r. Depending on whether there still is such a record, continue with step 5.2 or 5.3, as indicated above.
7. If h'<h:
   This case means hash bucket b was merged.
   7.1 Find the next record in hash bucket b' at offset greater than or equal to r. Depending on whether there still is such a record, continue with step 7.2 or 7.3, as indicated below.
   7.2 If such a record exists:
      Compute the hash value of the key in the record and set b" to be the h least significant bits of the hash value. If b" is not equal to b, skip this record, i.e., update the offset r in the scan cursor to be the next offset after this record and go back to step 7.1.
      Check if there is still space in the buffer provided to return the record; if not, return with the current cursor value.
      If there is enough space, copy the record into the provided buffer and update the offset r in the scan cursor to be the next offset after the record that was just copied.
      Go back to step 4.
   7.3 If no such record exists:
      Compute b" to be the next hash bucket in depth first order: b"=reverse(reverse(b, h)+1, h) If b" is equal to zero, we have reached the end of the scan. In this case, exit from the scan routine, returning the current cursor value.

Otherwise, check whether (b mod 2¬h') is equal to (b' mod 2¬h') If so, this means the next bucket to visit is still one of the buckets that was merged into bucket b'. In this case set r to zero and go back to the beginning of step 7, which will start the next pass over the merged bucket b'.

Otherwise, the pass of the merged bucket is finished. In this case proceed as in step 5.3., i.e., set b and b' to b", set r to zero, set h and h' to be the hash tree level found in the header of hash bucket b, and then go back to Step 4.

With this implementation of our sequential scan procedure being described, we now turn to the method used for encoding the cursor value.

To minimize the number of bits required to hold a cursor value, the hash tree level and hash bucket number can be combined into a single value requiring only one more bit than the number of bits required to hold the largest permissible bucket number. This is possible because the bucket number must always be less than or equal to 2¬L, where L is the level. The encoding is below. One parameter used by this encoding is the maximum hash tree level, i.e., the maximum depth to which any branch of the tree can grow.

Cursor encoding for hash tree level L and hash bucket number B:

Let M=maximum hash tree level
Compute H=M−L
Compute R=bit-wise reverse of B
Encode bucket number and level as 2¬H+R*2¬(H+1)

To decode, count the number of low order zero bits and subtract this from M to get the level (L). To get the bucket number, shift the encoded value right L+1 bits and perform a bit-wise reverse of the result.

Of course optional features will occur to those skilled in the art after reading this description. For instance, the system can implement locking and concurrency control to allow concurrent updates in different hash buckets and also implement overflow blocks. While we don't really need a temporary buffer to handle splits during a sequential scan, we could use the buffer provided by the caller. In particular, one could imagine applications using a sequential scan interface that returns only one record at a time (e.g., database?), where it doesn't make sense to reconstruct a whole bucket just to return a one record.

Allocating Storage in a Shared Disk File System

Parallel allocation is a feature of our preferred embodiment. This means that we provide for encoding an allocation map (e.g. a bit map) that, in comparison to a conventionally encoded allocation map, reduces the interference among multiple nodes simultaneously allocating disk blocks on multiple disks comprising a shared-disk file structure. Our system also allows multiple nodes to simultaneously deallocate disk blocks with reduced interference.

While there are allocation concepts embodied in a file system and there are conventional methods for use by a file system to allocate storage, there are problems with the conventional methods used in a shared-disk file system, and this has presented a need for an invention which allows for allocating and deallocating storage that performs well in a shared disk file system as used in a parallel file system.

In general, a file system is a computer program that allows other application programs to store and retrieve data on media such as disk drives. For brevity, the subsequent discussion will use the term disk, but the concepts apply to any similar block structured storage media. A file is a named data object of arbitrary size. The file system allows application programs to create files and give them names, to store (or write) data into them, to read data from them, to delete them, and perform other operations on them.

In general, a file structure is the organization of data on the disk drives. In addition to the file data itself, the file structure contains metadata: a directory that maps file names to the corresponding files, file metadata that contains information about the file, most importantly the location of the file data on disk (i.e. which disk blocks hold the file data), an allocation map that records which disk blocks are currently in use to store metadata and file data, and a superblock that contains overall information about the file structure (e.g. the locations of the directory, allocation map, and other metadata structures).

On the other hand, one must recognize that a shared disk file system is one in which a file structure residing on one or more disks is accessed by multiple file systems running on separate computers. For purposes of our preferred embodiment, we assume for the purpose of the file structure that these computers (or nodes) have no shared memory (even though they could and in many likely implementations would have local memory and at least some shared memory as do many SMPs) and are connected to the disks on which the file structure resides by some means such as a bus or a switching network, either of which may be considered a communication network for these purposes. Furthermore, we assume that the nodes communicate with each other by some similar means. A shared disk file system allows a computation that uses the file structure to be broken up into multiple pieces that can be run in parallel on multiple nodes. This allows the processing power of these multiple nodes to be brought to bear against the computation.

An allocation map is part of our file structure. Consider a file structure stored on N disks, D0, D1, ..., DN−1. Each disk block in the file structure is identified by a pair (i,j), e.g. (5,254) identifies the 254th block on disk D5. The allocation map is typically stored in an array A, where the value of element A(i,j) denotes the allocation state (allocated/free) of disk block (i,j).

The allocation map is typically stored on disk as part of the file structure, residing in one or more disk blocks. Conventionally, A(i,j) is the kth sequential element in the map, where k=iM+j, and M is some constant greater than the largest block number on any disk.

To find a free block of disk space, the file system reads a block of A into a memory buffer and searches the buffer to find an element A(i,j) whose value indicates that the corresponding block (i,j) is free. Before using block (i,j), the file system updates the value of A(i,j) in the buffer to indicate that the state of block (i,j) is allocated, and writes the buffer back to disk. To free a block (i,j) that is no longer needed, the file system reads the block containing A(i,j) into a buffer, updates the value of A(i,j) to denote that block (i,j) is free, and writes the block from the buffer back to disk.

Handling shared access to the allocation map has been a particular need. If the nodes comprising a shared disk file system do not properly synchronize their access to the shared disks, they may corrupt the file structure. This applies in particular to the allocation map. To illustrate this, consider the process of allocating a free block described above. Suppose two nodes simultaneously attempt to allocate a block. In the process of doing this, they could both read the same allocation map block, both find the same element A(i,j) describing free block (i,j), both update A(i,j) to show block (i,j) as allocated, both write the block back to disk, and both proceed to use block (i,j) for different purposes, thus violating the integrity of the file structure. A more subtle but just as serious a problem occurs even if the nodes simultaneously allocate different blocks X and Y, if A(X) and A(Y) are both contained in the same map block. In this case, the first node sets A(X) to allocated, the second node sets A(Y) to allocated, and both simultaneously write their buffered copies of the map block to disk. Depending on which write is done first, either block X or Y will appear free in the map on disk. If, for example, the second node's write is executed after the first's, block X will be free in the map on disk. The first node will proceed to use block X (e.g. to store a data block of a file), but at some later time, another node could allocate block X for some other purpose, again with the result of violating the integrity of the file structure.

To avoid corrupting the file structure, a node must obtain a token for each bit map block before reading it into memory, and if the node modifies the block (i.e. by allocating or freeing a block), it must write the block to disk before releasing the token. Tokens are normally obtained from and released to a "distributed token manager" such as the lock manager described in U.S. Pat. No. 5,454,108. The overhead of obtaining tokens from the token manager, and of writing map blocks back to disk before releasing a token held on the block, can substantially degrade the performance of a shared disk file system.

We allow striping of data across multiple disks as in a RAID environment. Striping is a technique to store successive data blocks (e.g. of a file) on distinct disks. The advantages of striping include high performance and load balancing. In striping, the file system writes successive blocks of a file to distinct disks according to some cyclic permutation of the disk numbers 0, . . . , N−1. For the conventionally structured allocation map writing a file of N blocks or longer requires locking, searching, updating, and writing N map blocks (or the entire allocation map, if it is smaller than N blocks). The overhead of doing this is much higher than allocating N blocks contiguously on a single disk. Furthermore, in a shared disk file system, the node writing the file may incur significant delays waiting for other nodes to release locks on the required allocation map blocks.

Against this backdrop we have provided a disk allocator using a segmented allocation map providing for storing and managing an allocation map that supports striping files across multiple disks, while minimizing the locking, I/O, and search overhead associated with allocating blocks. In comparison to the conventional allocation map described above, our disk allocator greatly reduces the number of allocation map blocks accessed when allocating a striped file. Furthermore, in a shared-disk file system, it greatly reduces the lock contention and allocation map block reading and writing when multiple nodes simultaneously allocate striped files.

The basic idea behind the disk allocator described here is to subdivide the allocation map into a number of regions. If the map is divided into K regions, each region controls 1/K of the blocks on each of the N disks. The file system locks regions, rather than individual allocation map blocks, to synchronize access to the map. By using distinct regions, multiple nodes can simultaneously allocate striped files without interfering with each other.

For disks with M blocks, each region contains MN/K elements of the allocation map. Ideally, these MN/K elements fit in a single allocation map block, but if the number of disks (or the size of each disk) is sufficiently large, or if the number of regions is sufficiently small, regions may be larger than allocation map blocks. To allow the allocation map to use the same block size as regular files, regions are composed of one or more segments, where each segment is at most the size of an allocation block and controls allocation of blocks on a subset of the N disks. If regions are less than half the size of map blocks, multiple regions are packed into each map block.

The parameters that determine the organization of the segmented allocation map are the number of regions, K, as well as the number of disks, N, and the disk capacity expressed as the number of blocks per disk, M. The number of regions should be chosen to be at least as large as the number of file system nodes, so that each node can allocate from a different region.

If B allocation map elements fit in a block, then the minimum number of blocks, and hence the minimum number of segments required to store each region, is given by $$\text{ceil}((NM/K)/B),$$

since each region stores 1/Kth of the elements for each disk, i.e., NM/K elements per region. However, in order to allocate a block on a particular disk, it is desirable to keep all allocation map elements that refer to the same disk within the same segment, i.e., within the same block of the allocation map. With this constraint, each segment can hold allocation elements for d different disks, where d is given by $$d=\text{floor}(B/(/K)=\text{floor}(BK/M).$$

Note that K must be chosen to be at least M/B: otherwise, d will be zero, i.e., the allocation map elements that refer to the same disk will not fit within a single block. The number of segments per region is therefore given by $$L=\text{ceil}(N/d)=\text{ceil}(N/\text{floor}(BK/M)).$$

We will use the notation S(p,q) to refer to the q'th segment of the p'th allocation map region, where p ranges from 0 to K−1 and q ranges from 0 to L−1. The elements of the allocation map are then assigned to segments as follows. Element A(i,j), which denotes the allocation state of the j'th block on the i'th disk, is stored in segment S(p,q), where $$p\ j\ \text{mod}\ K$$

and $$q=\text{floor}(i/d).$$

Segments are laid out in successive allocation map blocks in the following order:

S(0, 0), S(1, 0), S(2, 0), . . . , S(K-1, 0),
S(0, 1), S(1, 1), S(2, 1), . . . , S(K-1, 1),
. . .
S(0, L-1), S(1, L-1), S(2, L-1), . . . , S(K-1, L-1)

In other woods, the first segment of each region is stored at the beginning of the allocation map, followed by the second segment of each region, and so on. This layout makes it possible to extend the file system by adding more disks without requiring a complete reorganization of the allocation map: adding more disks to the file system requires storing more allocation map elements in each region, which may require adding one or more segment to each region. (How many segments will be required is determined by re-calculating L with a new value for N). The additional segments are simply appended to the end of the existing allocation map.

To allocate successive blocks of a striped file, a node obtains a token for a region and allocates successive blocks according to the striping permutation using free blocks in the region (i.e. blocks whose allocation map elements indicate their state is free). Before releasing the token, the node writes the region back to disk. If, when trying to allocate a block on a particular disk, the region is found to contain no free block on that disk, the node switches regions: it writes the region back to disk and releases the token, then obtains a token for another region and attempts to allocate from it. If the node unsuccessfully tries all regions in an attempt to find a free block on a particular disk, it can then either (depending on the file system's striping policy) allocate a bloc on another disk or return an "out of space" condition to the application. In the former case, when all disks have been unsuccessfully tried, the file system returns "out of space". As a performance enhancement, the file system would typically allow other nodes to "steal" the token for its region between file block writes. In response to a token steal request, the node writes the region to disk and relinquishes the token. Block deallocation remains as described in Section 2.1. on page 2; to deallocate a block, the file system reads in the region containing the allocation map describing the block, updates its state to free, and writes the region back to disk before releasing the token.

While the allocation map organization and algorithm described above greatly reduce interference among nodes writing files at the same time, some interference is possible. This is due to the fact that, when switching regions, a node has no information on which to base its choice of region to switch to. Ideally, it should switch to a region not presently in use by another node and one that has sufficient free blocks to allow it to continue writing without further region switches.

To provide means to enable a node tic make an informed choice of regions, we introduce an allocation manager, which is a program that keeps track of which node (if any) is using each allocation region, and of approximately how much free space remains in each region. During file system initialization, the allocation manager examines each region to count the number of free blocks in each and keeps this information in a table. Before switching regions, a file system node sends a message to the allocation manager to notify it of the region it is switching from (including the present amount of free space in the region) and to obtain a suggested region to switch to. The allocation manager updates its table to indicate the free space in the region being switched from and to show it as no longer in use. It then examines its table to determine another region that is not in use and with the greatest amount of free space, relies to the file system node with the number of this region, and updates its table to indicate that the region is in use. If all other regions are in use, the allocation manager chooses one at random. This protocol reduces the number of region switches by favoring switching to unused regions.

Although the above algorithm localizes allocation map accesses for file creation, it is still possible for file deletion to cause frequent region switches and therefore interfere with nodes that are simultaneously writing files. Even if the blocks in individual files are localized to a single region, it is still frequently the case that a node will delete a number of files (e.g. the contents of a directory) that were created by different nodes or at different times and were therefore allocated from different regions. This will cause deallocation and thus cause performing frequent region switches.

To reduce these region switches, the allocation manager and file system provide means to direct block deallocation to the node (if any) that is currently using the region controlling the block being deallocated. This is implemented as follows:

to delete a block, the file system first sends a message to the allocation manager to obtain the identity of the node presently using the region. The allocation manager responds with the node's identity, or an indication that the region is not in use. In the latter case, the node deallocates the block as described in Section 3.2. on page 4. In the former case, the node sends a message to the node indicated by the allocation manager telling it to deallocate the block. If the second node indeed is using the region, it deallocates the block and responds to the first node to indicate that it has done so. If the second node is not using the region, it responds to the first node to inform it of this, whereupon the first node deallocates the block. To reduce message traffic, deallocation messages can be batched. For example, when deleting a file, the blocks that belong to the file can be sorted by allocation region, and a single deallocation message containing blocks that belong to the same region can then be sent to the node that is presently using that region.

Handling Shared-Disk File System Interference

Our system allows multiple nodes comprising a shared-disk file system to allocate space independently which avoids unnecessary interference with each other. Various improvements have been made to achieve this.

Dynamic Prefetch for a Scalable Parallel File System

Prefetching is a technique used in file systems to reduce I/O latency by reading blocks of sequentially accessed files in advance of when the data is requested by application programs. Our system handles the problem of dynamically scheduling and adjusting file system resources devoted to prefetching, so as to maximize throughput and minimize I/O latency in a parallel file system, i.e., a file system in which data for the same file is distributed across multiple disk devices.

Within the system is a system service referred to as the "buffer manager", which arbitrates use of memory resources among different system components competing for memory each component must provide the buffer manager with information that the buffer manager needs in order to decide how much memory to allocate to each component. This information consists of the following two numbers:

1. The desired memory size. This number indicates how much memory a component could effectively make use of, if available.
2. Current activity level. This number must provide a measure of the frequency of memory usage of a component, typically expressed in the amount of memory accessed per time period.

The buffer manager, in turn, informs each component how much memory it has assigned for use by that component.

One of the components competing for resources is the file system buffer pool, which is used to cache recently accessed file data and data that was prefetched for sequential readers. We provide the buffer manager with appropriate information to take into account resources required for prefetching, and schedule the resources assigned by the buffer manager so as to maximize file system throughput and minimize I/O latency.

The following outlines how this is accomplished. Additional details are provided in Tables 3 and 4, and are further explained following this outline.

The file system buffer pool is logically divided into two parts, one used for prefetching ("prefetch pool"), and one used for caching recently accessed file blocks ("general pool"). By "logically divided" we mean that individual buffers do not need to be specifically assigned to one pool or another; rather, this division is represented by maintaining a single number that indicates how much of the total buffer space is to be used for prefetching.

These two pools are presented to the buffer manager as two separate components, i.e., the file system computes separate desired memory sizes and activity level for the general pool and the prefetch pool.

The activity level of both pools are computed using traditional techniques, such as reference counts, that measure data access rates. Since the two pools are only logically separate, this is done by keeping separate counts for each pool; on each buffer access, the appropriate count is updated based on whether the buffer is being accessed by sequential or random I/O.

The desired size of the general pool is computed by measuring working sets using reference bits and counters to determine the total amount of distinct file data accessed over some time period.

The desired size of the prefetch pool, however, is computed differently. This computation takes into account the number and capability of the disk devices belonging to the file system as well as the number of files being accessed sequentially and the rate at which the data is being read. This computation is further explained below and described in detail in Table 3.

The numbers computed in the previous step are provided to the buffer manager, which uses them to determine how mulch memory to assign to the two components representing the file system's general and prefetch pool. The file system sets the total size of its buffer pool to be the sum of the memory assigned to these two components. The amount of memory assigned to the component representing the prefetch pool is used to determine how much data to prefetch. When and what data is prefetched is described in detail in Table 2.

The algorithms presented in Tables 3 and 4 are best explained by starting with a simple example of a single application reading from one file stores, in a non-parallel (single disk) file system; we will then consider how multiple applications and file systems with multiple disks are handled.

In the simple example, double buffering (two prefetch buffers) is sufficient to provide optimal throughput and performance. When the application begins reading the file, the file system reads the first block of the file into one of the prefetch buffers. As soon as the first I/O finishes, the file system reads the second block of the file into the other prefetch buffer. While the second I/O is in progress, read requests from the application are satisfied by retrieving file data from the first buffer. If the end of the first buffer is reached, subsequent read requests can he satisfied from the second buffer as soon as the second I/O finishes. Once the second I/O has completed, and the application has read the last byte from the first block, the first prefetch buffer is re-used to prefetch the third block of the file, and so on.

If the application reads slower than the disk, then prefetch I/Os will complete before the application has finished reading data in the previous block. In this case the next prefetch I/O will be started as soon as the application has read the last byte of the previous buffer. In this case, data will be supplied as fast as the application reads it, and the application will never have to wait for disk I/O.

This is optimal. If the application reads the data faster than it can be retrieved from disk, it will need to wait for the currently active I/O to finish each time it reaches the end of one block, and a new prefetch I/O will be started as soon as the previous one finishes. In this case, data will be read as fast as it can be retrieved from disk, which is again optimal.

The algorithm shown in Table 3 generalizes this behavior to multiple application programs and multiple disks per file system; it computes a number of prefetch buffers required so that: (1) If the combined data rate at which all the application programs attempt to read data is less than the total available disk bandwidth, then data will be supplied to each application as fast as it reads the data, with no I/O waits. (2) If the combined data rate of the application programs is greater than the total available disk bandwidth, then data will be read as fast as it can be retrieved from disk.

Both cases require determining the rate at which each application program attempts to read data. This is done by measuring the application "think time", i.e., the time the application spends processing the data supplied by the file system. The think time includes overhead in the read system call for accessing data in the file system buffer pool and for copying it into the application's buffer, but does not include time spent in the file system waiting for data to be read from disk. We define the application "data consumption rate" over some time interval to be the amount of data read by the application during the interval divided by the total think time in that interval.

Let us first consider the case where the total consumption rate is less than the total disk bandwidth. In this case, proper prefetching should be able to supply the desired data without requiring any of the applications to ever wait for I/O. If the total consumption rate is greater than the bandwidth of a single disk, it will be necessary to do prefetch I/O on multiple disks in parallel in order to sustain the desired data rate. The minimum number of parallel I/Os required can be computed by dividing the total consumption rate by the bandwidth of a single disk and rounding the result tip to the next whole number. We will call this number the "parallelism factor". In order to supply the desired data without requiring any of the application programs to wait for I/O, enough additional buffers must be available so that each application program can read previously fetched data from another buffer while prefetch I/Os are in progress. The optimal number of buffers for prefetching is therefore given by adding the number of file instances open for sequential I/O to the parallelism factor. As an application program reads the last data from a previously fetched block, that buffer becomes available to do the next prefetch I/O. As shown in the algorithm in Table 4, this buffer will then be used to prefetch the next data block for the application that is closest to the end of the buffer it is currently reading from. By "application closest to the end a buffer" we mean the application that, according to its current consumption rate, will request data from the next block the soonest.

Using the optimal number of prefetch buffers, no application will need to wait for I/O, provided it never reads data earlier then the time predicted based on the measured consumption rate. If actual consumption rates are not constant, the number of prefetch buffers can be increased to take variations in consumption rates into account. This is done by not just measuring think time averages, but also the variance of the think time for each application. This is then used to compute a "variance adjusted consumption rate", i.e., a rate such that almost all read requests (e.g., 90% or 95% of all requests) arrive no earlier than the time predicted based on the variance adjusted consumption rate. This variance adjusted consumption rate is then used to compute the parallelism factor instead of the average consumption rate.

Let us now consider the case where the total consumption rate of all applications exceeds the total disk bandwidth of the file system. In this case the parallelism factor computed, as described above, will be a number that is larger than the number of disks available to the file system. Since it is not possible to start more concurrent I/Os than there are disks, there is no point in assigning more buffers for prefetch I/O as there are disks. Therefore, the desired number of prefetch buffers is calculated as the number of file instances open for sequential I/O plus the number of disks or the parallelism factor, which ever is smaller. If the consumption rate exceeds the total disk bandwidth, this number of prefetch buffers will be sufficient to keep all disks busy, i.e., to start a new prefetch I/O as soon as the previous I/O on a disk has finished. Thus data will be supplied as fast as it can be retrieved from a disk.

Finally, we will describe two refinements to the calculation described above that take into account properties of the I/O subsystem to which the file system disks are attached. The first one applies to systems in which there is a significant delay between the time that an I/O request is submitted to the device driver and the time at which the actual I/O is started. For example, such a delay occurs with network attached disks (e.g. VSD), where an I/O request needs to be routed through the network before it reaches the disk. In order to achieve maximum disk throughput, the next I/O request to a disk must be issued to the device driver before the previous I/O has finished. In order to do so, a prefetch buffer to start the next I/O must be available earlier than it otherwise would. Hence, the number of buffers devoted to prefetch I/O must be larger than the number of disks by a factor of (1+epsilon), where epsilon is given by the ratio of the average I/O request delay and the average disk I/O time.

The second refinement in the buffer calculation takes into account limitations of I/O subsystem components such as disk controllers and I/O bus. If the number of file system disks is large, adding up disk bandwidth may yield a number that is larger than the total disk I/O throughput that the system can support. If this is the case, then the number of prefetch buffers devoted to prefetch I/O need not be as large as the number of disks. Instead, a number of buffers equal to the total I/O throughput divided by the bandwidth of a single disk will be enough to start as many disk I/Os in parallel as the system can effectively support. The total disk I/O throughput can be determined either from hardware specifications, by explicitly measuring throughput when the file system is installed, or by recording the maximum throughput ever observed while the file system is running.

Both of the refinements described above can be expressed by calculating an "effective number of disks", which is then used in place of the actual number of disks in the prefetch buffer calculations, as shown in Table 3.

TABLE 3

Computing the desired size of the prefetch pool

1. Compute the effective number of disks as
    n_eff = MIN( ceil((1 + L_start/L_io)*n_disks),
    ceil(T_sys/T_disk) ),
    where,
       n_disks = number of disks available to the file system
       L_io = average I/O latency to read on block from disk
       L_start = average I/O start latency
       T_sys = maximum total I/O throughput of the disk subsystem
       T_disk = average I/O throughput of a single disk
2. For each open file instance, i, that is being accessed sequentially, compute an adjusted consumption rate, c_i, such that a fraction f (e.g. 90%) of all requests for the next data block arrive no earlier than the time predicted by the adjusted consumption rate, i.e., at intervals of a length given by the file system block size TABLE 3-continued Computing the desired size of the prefetch pool divided by c_i. This can be computed statistically by measuring the average consumption rate and variance for the instance.
Compute the total adjusted consumption as the sum of the adjusted consumption rates of all sequential open file instances:
    c_total = sum c_i, for i = 1 . . . n_inst
where
    n_inst = number of sequentially accessed open file instances
Compute the desired prefetch parallelism factor as
    n_para = c_total/T_disk
3. The desired number of prefetch buffers is then calculated as follows using the values computed in Steps 1 and 2:
    n_bufs_desired = MIN(n_para, n_eff) + n_inst

TABLE 4

Scheduling prefetch I/O

Input to this procedure is the actual number of prefetch buffers, n_bufs_assigned, that was assigned by the buffer manager based on the desired number of buffers, n_bufs_desired, computed as shown in Table 3.
The algorithm maintains two global counters: n_io_total is the number of prefetch I/O's currently in progress (or has been submitted to the device driver), and n_prefetched is the number of buffers holding prefetched blocks that have not yet been read by the application for which the block was prefetched. The sum of these two numbers is the number of buffers currently in use for prefetching.
Also, for each sequentially accessed open instance i, the algorithm keeps track of the predicted time at which the application will access the next block for which no prefetch I/O has been started yet. We denote this number by t_next[i].
1. Initialize n_io_total and n_prefetched to zero.
For each sequentially access open file instance i, initialize n_io[i] to zero, and initialize t_next[i] to be the time at which the application will request the next data block, based on the adjusted consumption rate, c_i.
Construt an ordered instance list by sorting all sequentially accessed open instances by t_next[i], smallest value first.
2. If n_io_total + n_prefetched is greater than or equal to n_bufs_assigned go to step 4; otherwise, continue to the next step.
3. Submit the next prefetch I/O request for the first instance i in the ordered instance list (this will be the instance with smallest t_next[i] value).
Update t_next[i] to be the predicted time at which the application will request the next data block after the one for which the prefetch I/O was just started. Re-order this instance in the ordered instance list of all instance according to its new t_next[i] value
Increment n_io_total.
Go back to Step 2.
4. Wait for one of the following events to occur:
a) A prefetch I/O completes:
Decrement n_io_total and increment n_prefetched
Go back to the beginning of Step 4 (wait for the next event ).
b) A read operation reaches the end of a block that had been prefetched
Since the read operation will copy the data out of the prefetch buffer into the application's address space, that buffer is now available for another prefetch.
Decrement n_prefetched and go back to Step 2.
c) The buffer manager changed the number of buffers assigned to the prefetch pool (n_buf_assigned):
Go back to Step 2.
d) An open instance i is closed.
Remove the instance from the ordered instance list.
Decrement n_prefetched by the number of buffers prefetched for that instance.
Go back to Step 2.

Buffer Management with Improved Cache Performance

Our parallel file system is developed for use on IBM machines where performance is a crucial factor. One of the aspects that can affect performance is the file system's cache utilization. The problem is that requests for cache space of varying sizes are presented to the system in an unpredictable fashion. We have implemented a cache management scheme in which we identify the current usage pattern in the system and adjust the cache behavior accordingly and thus improve on both performance and space utilization. We generally improve cache performance, space utilization and distribution via our usage pattern analysis.

Our cache usage and replacement effectiveness is boosted because our system recognizes the workload kind under which it is currently operating, and we tune the cache behavior accordingly. The two types of workloads that are detected and responded to by the suggested scheme are sequential and random workloads. The rationale behind this separation stems from the difference in definition of working set size between both workloads. Future behavior is predicted by analyzing the current state. Once the current usage pattern in the system has been established, and assume it to be relatively stable, the cache responds accordingly.

The complete cache is split into different working units, each of which controls a portion of the complete cache space and is responsible for buffers of a different size. Each working unit is comprised of two sub-units that monitor the two kinds of workloads the system operates with. The amount of different working units and the buffer sizes that they are responsible for change dynamically. The cache manager recognizes at each moment in time the buffer sizes for which, with a high probability, there will be a lot of demand, and sets up the working units accordingly. There always exists one further working unit that takes a care of incoming requests for buffer sizes that differ from all other working units' fixed size. This enhances cache response time by pointing incoming requests directly to the cache portion which hosts buffers of the desired size. This aspect helps alleviate the problem of cache fragmentation by limiting the problem to one working unit and taking extra measures, such as merging and re-mapping, only there. Usage statistics are constantly updated for each sub-unit of every working unit.

Periodically, the gathered usage statistics are examined. As a consequence the cache space is re-divided among the different working units. Since our system predicts future usage patterns by analyzing current ones, the new space re-division is not acted upon immediately but rather takes effect upon demand. Each working unit has two kinds of space limits, namely, an internal and an external one. The internal space limit divides between the two sub-working units. The external space limit is further divided into two kinds of limits, namely, the physical limit and the virtual limit. The physical limit represents the actual amount of space under control of the usage pattern scheme distribution that belongs to the individual working unit. The virtual limit is the one projected by the usage pattern analysis— prediction process as the physical limit this working unit should attempt to achieve. The virtual limit is used to deduce whether a specific working unit's physical limit is allowed to grow or whether it is forced to give up a portion of the space under its control upon a request from a working unit that is allowed to grow, thus, in essence it is allowed to shrink.

The process of setting new virtual limits works as follows. The sub-working units' statistics are analyzed and used to deduce the usage pattern and activity level that determine the space optimally needed by it. Each sub-working unit attempts to obtain the amount of space it determined to be optimal for its needs, (its working set size). The relative activity level of the sub-working unit presents a cap on the optimally needed space.

New space acquisition is governed by a scheme in which physical and virtual limits within each working unit interact as follows. When a request for a new buffer arrives, it is served by the working unit which controls the size requested. If there is a free or a very easy and quick to obtain buffer in the working unit, it is used to satisfy the incoming request. The working unit then proceeds to compare its physical limit with its virtual limit. If the physical limit is not smaller than the virtual one, the working unit proceeds to find the easiest to obtain space already under its control. Otherwise the current working unit finds the working unit that is allowed to shrink the most and directs a space acquisition request to it. The receiving working unit finds the easiest to obtain space under its control and gives Up the control over it. The original working unit then proceeds to assume control over the new space and uses it to satisfy the incoming request.

The frequency with which the usage pattern detection process is run might have a crucial impact on the effectiveness of the whole scheme. If the process is run too frequently, it might react too harshly to very short activity peaks in a certain sub-working unit. On the other hand if this process is run at large intervals, its effectiveness and accuracy are reduced as time passes. Thus each time the process runs, it determines when it should run next. That calculation is based on the expected time for all the working units to access all the space under their control. That period is subjected to pre-defined upper and lower bounds. This interval permits the usage pattern process to deduce the current workload distribution without being affected by a single, straining event. The working set of random workload clients can be deduced as well as the space needed for read-ahead of sequential workload clients.

This scheme encompasses added performance and usage of available cache space in a multi-purpose environment.

Those familiar with prior ways of managing a file system cache will now appreciate how our method of optimizing cache utilization by identifying usage patterns is an improvement over prior treatment which viewed the cache as a single working unit and merely satisfied incoming requests in a least recently used fashion.

When we anticipate the nature of incoming requests and prepare for it, each incoming request is directed towards the cache region which with a high probability will be used to satisfy it. Moreover, we know the space amount that can be devoted for each workload in each working unit and thus can adjust other system actions accordingly, (e.g. prefetching rate).

Extended File Attributes for Support of Access Control Lists.

As we have said, we concluded that it would be desirable to provide Access Control Lists for our shared-disk file system for parallel execution by different computers in the environment. In order to do this we provided extended file attributes for efficient support of Access Control Lists, of the kind known in the Unix environment.

Extended attributes allow associating variable-length information with a file that can be accessed separately from the data stored in the file itself. One use of extended attributes is for storing access control lists, "ACLs" for short, which are used to control what users or groups are permitted to access a file in what way (read, write, etc.). ACLs place demands on an extended attribute implementation that are unlike many other uses of extended attributes: Since all file system operations that check access permission need to access the file's ACL, quick and efficient access to the ACL data is critical to file system performance. On the other hand ACLs are typically short, do not change very frequently, and even if every file has an ACL, many of these ACLs will be the same, i.e. there are typically significantly fewer different ACL values than there are files. We will describe how to implement extended attributes in a way that exploits the usage characteristics exhibited by ACLs and provides space efficient attribute storage that allows quick access to the attribute data. Furthermore, this implementation supports attribute inheritance very efficiently. It is particularly well-suited for implementing POSIX ACLs.

Basically, our extended attribute implementation in this invention employs the following components:

- The attribute file ("AttrFile" For short). This is a special file that stores all attribute data. It consists of a sequence of entries; each entry is of one of the following two types: an attribute entry, which contains the value of a particular attribute, or a free space entry, which marks free space within the attribute file, i.e., space that can be re-used the next time it is necessary to add a new attribute entry to the AttrFile. Both types of entries are variable length, but are aligned on suitable boundaries (e.g., multiples of 8 or 16 bytes) to reduce fragmentation. The choice of a particular alignment size depends on the minimum and average size of attribute entries.
- Attribute references ("AttrRefs" for short). These are short values stored in each file's inode that allow locating the attribute data for that file in the AttrFile. This location is represented by the offset of the attribute entry within the AttrFile given in units of the alignment size, i.e., an AttrRef is computed as the byte offset divided by alignment size.
- The attribute index ("AttrIndex" for short). This is a data structure that allows finding a particular attribute value in the AttrFile. The structure and use of the AttrIndex is described in more detail under "Attribute Value Lookup" in the next section.
- An attribute garbage collector. This is a process that is started at appropriate times to remove attribute entries from the AttrFile that are no longer referenced by any of the existing files.

Attribute Value Sharing

In our preferred embodiment of our shared-disk file system, attribute value sharing is provided as an extended attribute implementation. This allows sharing of physical attribute storage among all files that have attributes with identical values. This is accomplished by storing all attribute data in a common place, the place we would call the AttrFile. The AttrRef stored in the inode of a file "f" contains the location of the entry that holds the attribute data for "f" in the AttrFile, represented by the offset of the entry in the AttrFile. Files with identical attribute values will contain the same AttrRef values in their inode. This attribute value sharing is accomplished is the following two manners:

1. Attribute Inheritance

Attribute inheritance means that when a new file is created, its extended attributes are set to the same values as an existing file that it is derived from. For example, when copying a file, the attribute values of the copy may be set to the same values as the original file. POSIX ACLs are an example of a different type of attribute inheritance: The proposed POSIX ACL standard specifies that when a new file or directory is created, its ACL is set to a default ACL value associated with the directory in which the file is created. In other words, under POSIX ACLs a new file inherits its ACL from its parent directory.

According to our invention, this attribute inheritance is accomplished simply by copying the AttrRef from the inode of the file or directory from which the attribute is inherited. This way the inherited attribute will share the same physical storage as the attribute it is inherited from.

2. Attribute Value Lookup

In order to set or change an attribute to a value that is not inherited from another file, the attribute index is employed to determine whether an entry with the same value already exists in the AttrFile. An indexing method, such as hashing, can be used for this purpose: To set or change an attribute value, a hash function is applied to the attribute data. The resulting hash value is used as an index into a hash table, where a list of AttrRefs will be found that refer to entries in the AttrFile with attribute data that hash to the same hash value. The new attribute data to be stored is compared against the data in all of these entries. If a match is found, an AttrRef referring to the existing entry is stored in the file's inode. If no match is found, a new entry containing the new attribute value is added to the AttrFile, and an AttrRef to the new entry is stored in the file's inode as well as in the hash table so that future attribute updates using the same attribute value will find the new entry.

In order to increase the likelihood of attribute value sharing, new attribute values are, if possible, converted to a canonical form before storing or looking them tip. For example, the entries in an access control list can be sorted by user or group id; this will allow two ACLs that are functionally equivalent to share the same storage in the AttrFile, even though the two ACLs might not have been presented in the exact same format when they were set.

As implemented our system of storing extended attribute is especially suitable for storing ACLs, and other, similar uses. While a user might own a large number of files, it is quite unlikely that the user will associate a different ACL with each one of his/her files. Rather, there are typically groups of related files that all have the same access rights associated with them. For example, files that belong to a particular project would typically all have the same ACL, which grants access to users associated with the project. As another example, files within the same directory or subtree of the directory hierarchy will often share the same ACL. In fact, the purpose of ACL inheritance in the proposed POSIX ACL standard is to make it easier for a user to maintain a common ACL for files in the same directory. Therefore, we expect the total number of different ACL values in a file system to be significantly smaller than the total number of files; in fact, we expect it to be smaller by a large factor. This means that sharing ACL storage among files with identical ACLs will reduce the space overhead for storing ACLs by at least the same factor, compared to storing each ACL individually.

Furthermore, ACLs do not commonly contain a long list of individual users because such lists are difficult to manage. Rather, most systems allow defining user groups; a group can then be used in an ACL to refer to the risers that belong to that group. Therefore, it is uncommon for ACLs to be very long, which means an ACL can usually be stored in a small amount of space. This fact, combined with ACL sharing, means that it will be possible to cache ACL data for a large number of files in memory. This makes it very efficient to retrieve the ACL for a file because the ACL data is likely to be cached in memory, so that it can be accessed without additional disk I/O.

When ACLs for a large number of files are changed, it is likely that many of these ACLs will be changed to the same, new value. For example, such a change would happen to grant a new user access to the files associated with a particular project. Due to ACL sharing, only the first one of a set of related ACL change operations will require updating the AttrFile: subsequent ACL change operations using the same ACL value only require looking up the ACL value in the AttrIndex. This means that even tinder a workload with a large number of concurrent ACL updates, access to the AttrFile will be mostly read-only. Hence the fact that all attributes are stored in a common place will not cause a bottleneck problem. This is particularly important in a distributed environment where it is desirable to cache attribute data locally, which makes AttrFile updates much more expensive due to the need to invalidate attribute data cached on other nodes.

Garbage collection is an ongoing need which needs to be provided. Attribute value sharing makes it somewhat more difficult to reclaim space in the AttrFile when an attribute entry is no longer needed. The problem is to detect when it is safe to delete the entry, i.e., when the last file that was referring to the entry is deleted or its attribute is changed. A common solution to this problem is to maintain a reference count for each entry; the reference count would be incremented when an AttrRef referring to the entry is stored in a file's inode and decremented when an AttrRef is deleted. The AttrFile entry could then be deleted when the reference count goes back to zero. This solution, however, would require updating a reference count every time an attribute is inherited, stored, or updated, even if the new attribute value already exists in the AttrFile. Thus, access to the AttrFile would no longer be mostly read-only, causing a potential bottleneck.

Instead of reference counts, this invention reclaims attribute space through garbage collection. Garbage collection finds and deletes unused attribute entries as follows. Part of each attribute entry is a reference flag, "RefFlag" for short, which is always set when a new entry is added to the AttrFile. Garbage collection proceeds in the following three phases:

Phase 1

Scans the whole AttrFile and turns off the RefFlag in every attribute entry in the file.

Phase 2

Scans all modes. For each AttrRef found in an inode, turns the RefFlag for the corresponding attribute entry in the AttrFile back on.

Phase 3

Scans the AttrFile again and deletes all attribute entries that have the RefFlag still turned off.

To ensure that garbage collection will not delete entries for which new references are created during the garbage collection process, garbage collection needs to synchronize with the lookup operation that is a part of setting or changing a file attribute, as described under "Attribute Value Lookup" in the section on "Attribute Value Sharing" above. Since garbage collection may take a relatively long time—especially Phase 2—it is not desirable to simply disable all set/change-attribute operations while garbage collection is running. Instead, when a set/change-attribute operation finds an existing entry in the AttrFile with a value that matches the new value being set, it also checks whether the RefFlag in the entry is turned on before it stores the AttrRef in the file's inode. This way, explicit synchronization between garbage collection and attribute value lookup is necessary only during the last phase of garbage collection, and then only if the attribute value lookup finds an attribute entry with the RefFlag turned off.

The process of starting the garbage collection process is important. Without garbage collection, the AttrFile could keep growing without bounds even if the total amount of active attribute data (attribute values that are still referenced) does not. The rate at which the AttrFile would grow depends on the rate of set/change-attribute operations. For attribute uses, such as ACLs, the rate of such operations is essentially unpredictable. Therefore, a policy that starts garbage collection at fixed regular intervals (e.g., once a day) is not appropriate. Instead, we monitor the total size of attribute data, i.e., the size of the AttrFile minus the total free space in the AttrFile. Garbage collection is started every time the amount of attribute data has grown by a certain factor (e.g., 1.5 or 2). This policy is effective in preventing the AttrFile from growing if the amount of active attribute data stays constant.

Metadata Node Operation

This section describes the operation of the metadata node which improves performance in those cases where multiple computers need to update or enlarge the same data object. We start with the creation of a metanode for these functions and continue in describing methods of identifying the metadata node and recovering it.

Usage of a Metadata Node

This first section about our metadata node describes generally what our metadata node is and what problem it solves. A metadata node is used in our system for managing file metadata for parallel read and write in the shared-disk environment. The parallel file system makes it possible for any and all disks which make up the file system to independently be accessed by multiple processors. To exploit this capability, a file should be shared by multiple processors for both reading and writing.

There are several problems which can greatly reduce the performance of such access. Although nodes may read and write to different areas of the file if they present an appropriate lock on the sections which they are reading or writing, they all need to access the same metadata. The metadata includes the file size, the file access and modification times, and the addresses of the file's data blocks. For example, all operations that read and write the file need to know if they exceed the file size and update it if they extend the file. Such a single point of interest might present a serious bottleneck if true parallel write sharing to a file is needed.

We have implemented a system which allows each node to act as independently as possible when reading and writing the same files and devised a mechanism to synchronize these operations so that a consistent view of the file will be available from all nodes by providing our method for managing metadata information. Our method for the management of metadata information for a file in a shared-disk file system provides that, for each file, a single node is selected as the metadata-node (or metanode) for that file. The metanode is responsible for handling all the I/O activity of the metadata from and to the disk (or disks) on which the metadata reside.

All the other nodes communicate with the metadata node in order to fetch or update metadata information. However, these nodes do not access the metadata information on the disk directly.

The metadata node is elected to be the first node that accesses the file. Thus, if only one node needs to access the file, no extra overhead is incurred since the node can access the metadata directly. Additional nodes will access the metanode for metadata.

The introduction of a metanode prevents a considerable amount of disk activity, which presents a considerable performance improvement for a parallel file system with a fast communications switch.

The metanode keeps a cached copy of the metadata which reflects the metadata on disk. Other nodes also keep a cached copy of the metadata which they read in the past from the metanode, and which they augmented as needed (for example, changed the access time).

Each metadata element (access time, modification time, file size, data block disk addresses) has its own pattern of usage and special characteristics. For example, our system does not require a very precise access time, but one which is correct within five minutes. Thus, updates to the metanode do not need to be frequent, and thus, a considerable amount of communication is saved.

Also the file size does not to be exact on all nodes, as long as the system behaves consistently. Using a sophisticated way to control the file size on all nodes allows a parallel write scheme where multiple nodes may extend the file concurrently.

A great amount of disk access is saved by using a deferred sync algorithm. A sync daemon is a piece of software that runs as part of the operating system of each node. The sync daemon tries to flush dirty data and metadata to disk every N seconds. If M nodes write the rile in parallel, this means M disk accesses every N seconds for the metadata only. With parallel write, all nodes send their updated metadata to the metanode, which flushes the file every N seconds when it gets a signal from the sync daemon.

Every node would access the disk in order to read or write metadata.

Using Tokens

The second of the parallel write sections of this description relates to our use of lock modes for finding the metadata manager node. Tokens using lock modes of finding the metadata manager node are used for metadata node selection and identification in our parallel file system where all disks which make up the file system can independently be accessed by multiple processors. To exploit this capability, a file should be shared by multiple processors for both reading and writing.

In this system, a node is appointed for each file which is responsible for accessing and updating the file's metadata. This metadata node (or metanode) shares this information with other nodes upon request.

The metadata node keeps the information about the file's metadata and acts as a smart cache between the disk and all the nodes that access the file. There are situations when the metadata node (or metanode) ceases to serve this function. In order to enable smooth operation and recovery, these situations need to be handled. Nodes that used to access the metanode need to elect a new metanode in a straightforward way.

We elect metanode and make this information available to all nodes. The election process takes into account the access patterns of the file. There should be one, and only one, metanode per file. Also, the scheme should and does allow metanode takeover and recovery. In our system metanodes are selected, and their information is known to other nodes. We use a token manager subsystem. A token manager is a distributed subsystem which grants tokens to nodes. Every node can ask for a named token with a specific mode. The token manager grants the token to the node if the mode does not conflict with tokens with the same name which were granted to other nodes. For each token there is a list of the possible modes and a conflict table. If the requested token conflicts with a token which was granted to another node, a revoke is done, and the conflicting node downgrades its token mode to a mode which does not conflict with the requested mode.

The metadata node is elected to be the first node that accesses the file. Thus, if only one node needs to access the file, no messages, which are extra overhead, are needed since the node can access the metadata directly. Additional nodes will access the metanode for metadata.

For each file, we define the "metanode token". There are three modes for the metanode token: "ro" (read-only), "ww" (weak-write) and "xw" (exclusive-write). The rules are: "xw" token conflicts with all modes. "ww" conflicts with "xw" and itself. "ro" conflicts with "xw" only. Thus, there are two possibilities: either 0 or more nodes hold the token in "ro", and then at most one node can hold the token in "ww", or a single node holds the token in "xw". The Token Manager subsystem (or TM for short) is responsible for managing tokens for a node and making sure the token modes are consistent with this definition. The conflicts between the different modes can be summarized in the following Table 5:

TABLE 5

|    | ro | ww | xw |
|----|----|----|----|
| ro |    |    | ** |
| ww |    | ** | ** |
| xw | ** | ** | ** |

For the metanode, we devised the following algorithm: when a node opens a file for the first time, it tries to acquire the metanode token in mode "ww". The token manager TM grants the token in "ww" if it can, i.e., if no other node holds the token in "ww" or "xw". If this happens, the node becomes the metanode manager. Hover, if another node holds the token in "ww", then the TM grants the token in "ro". Then the node knows that another node is the metanode. It can query the TM to find out who the metanode for this file is.

There are situations when a node must become a metanode. In this case, asking for a "ww" token will not help since the old metanode will not downgrade its token. Here the node that wishes to become the metanode asks for an "xw" token. This will cause a revoke message to be sent to the existing metanode. The old metanode will then downgrade its token to "ro", and the TM will return a "ww" token to the new metanode. If a node asks for an "xw" token and no other nodes hold this token at all, then TM will grant the token in that mode.

If a node holds the token in "xw", then it is the metanode for this file, but in addition, no other node has this file open. In this case, if a node tries to acquire the token in "ww", a revoke message is sent to the metanode. As a result, the node downgrades its "xw" token to "ww", and the TM is thus able to grant a "ro" token to the new node.

Using Enhanced Token Modes for Controlling the File Size

The relevant file system standards require that the correct file size be available on demand; however, the maintenance of file size in parallel at all nodes in the presence of multiple applications appending data to the file is complicated and costly in terms of performance. The next of this series of features describes our way of maintaining file size so it is available when needed without constant overhead. In doing so a parallel file system where all disks that make up the file system can independently be accessed by multiple processors can be exploited with a file shared by multiple processors for both reading and writing without a constant overhead.

Read & write sharing of files involve accessing the file's size. Every read and write needs to check if the operation's offset is beyond the current file size, and return an EOF (end-of-file) if it is. Every write needs to check if the operation's offset is beyond the current EOF, and if it is, it should extend it. When there are several readers and writers, all this has to be consistent. Thus, if one node writes at offset 1000, a read by any node at that location should not return an EOF.

One way of keeping a consistent state is to serialize the accesses to the filer's size. This, however, will present a major bottleneck for parallel writers, since each write (and read) will need to get the current file size defile each operation.

In our preferred embodiment we keep a local copy of the file size within each node. Also, together with each copy, a lock mode is kept. A lock manager assures that lock modes that conflict do not co-exist. An appropriate lock mode for each read and write operation assures that the locally cached file size is accurate enough for a correct result of this operation. The different modes are:

"rw" for operations that Read and Write within the locally cached file size

"rf" for operations that Read beyond the locally cached File size

"wf" for operations that Write beyond the locally cached File size

"wa" for Write operations that Append to the file

"xw" for operations that reduce the file size (like truncate), and thus need an exclusive Write lock.

The conflict table of the file size's lock modes is:

TABLE 6

|    | rw | rf | wf | wa | xw |
|----|----|----|----|----|----|
| rw |    |    |    | ** |    |
| rf |    | ** | ** | ** |    |
| wf | ** |    | ** | ** |    |
| wa | ** | ** | ** | ** |    |
| xw | ** | ** | ** | ** | ** |

Whenever a node upgrades its lock mode, it reads the new file size from a special node that keeps track of the file size (the metadata node, or metanode for short). Whenever a node downgrades its lock mode, it sends its file size to the metanode. The metanode itself keeps a file size which is a maximum of all the file sizes that it received (except when a node locks the file size in the "xw" mode, which allows reducing the file size)

Some modes only allow reading the file size (rw rf). Some modes (wf, wa ) allow increasing the file size. One mode (xw) allows to decrease the file size. The true file size is the maximum of all the local copies of the file sizes that the nodes hold.

Operations that read or write within the locally cached copy of the file size, need an "rw" lock on the file size. Operations that read beyond the locally cached copy of the file size, need to ensure that the file size did not increase since they last read the file size. Thus, they need to acquire an "rf" lock (which conflicts with modes that increase the file size).

Operations that increase the file size acquire either a "wf" or "wa" lock. A "wf" lock is needed if the writer knows the new absolute file size. A "wa" lock is needed for APPEND operations. An APPEND operation writes at the current EOF. Thus, several APPEND operations will write one at the end of the other. Thus, "wa" conflicts with itself since one APPEND operation should wait for other APPEND operations.

The only mode that allows decreasing the file size is "xw". This is an exclusive mode which will cause all other nodes to relinquish their locks and thus lose the locally cached file size. Thus, after the node that acquired the "xw" finishes its operation (for example, a file truncate), all the nodes will have to get the new file size from the metanode.

We are not aware of a system where different file sizes are cached at different nodes so that parallel write sharing of the file is maximized, and yet the system presents a consistent view of the file for all users.

The solution allows users on different nodes to extend the file and thus to achieve a very high degree of write sharing. Write operations do not need to be serialized even if the users extend the file size.

Smart Caching of Byte Range Tokens Using File Access Patterns

The next of our parallel write developments addresses the locking used for all accesses; parallel and non-parallel.

Locking only the portion of the file that is required immediately is expensive and would require calls to the lock manager with every application call. This algorithm attempts to anticipate the requirements of the application considering what else is going in the system and to minimize the number of token manager calls.

For parallel reading and writing to the same file, in order to serialize accesses to the same regions in a file, a distributed lock mechanism is used. However, getting such a lock usually requires that a token will be acquired first, and this is considered an expensive operation. Thus, it would be beneficial to cache tokens at a node by anticipating the access patterns of the file. On the other hand, acquiring a token that is not needed might reduce performance since this token would be needed by another node. This disclosure describes the algorithm by which a node acquires a token so as to maximize performance by anticipating the file's access patterns.

Serializing accesses to different regions in a file to which processes on different nodes write in parallel is done by distributed byte range locks. When a process needs to lock a byte range, it first needs to acquire an appropriate byte range token. The byte range token represents the node's access rights to a portion of a file. Thus, if a node holds a byte range token for file X for range (100, 200) in read mode, it means that the node may safely read that portion of the file. However, to prevent stealing the token, the node must lock the token before the actual read, since if another node needs to write the same portion, it might steal the token. Locking the token prevents the steal. After the read has completed, the token is unlocked.

One can view tokens as a way of "caching" locks. When a node needs to lock a portion of a file, it needs to lock the token. At first, it will acquire a token and lock it. Once the operation is finished and the token is unlocked, it is still resident at the node. Thus, subsequent operations on the same region would not need to access the token authority. Only when the token is stolen will a new request for the token be needed.

Given this, it may be of benefit to request a larger token than needed to be locked. For example, if a process reads a file sequentially, and it reads from range 1000 to 2000, then although the next lock will be of range 1000 to 2000, it can request a larger token, for example, from 1000 to 10000. However, this may create excessive token traffic on other nodes. If another node is in the process of writing from 5000 to 6000, the token acquisition may delay the operation.

The idea is to give two ranges when acquiring a byte range token: a required range (which is the minimum range that is needed for the operation) and the desired range (which is the maximum range that is expected to be of any use). The token manager is guaranteed to grant a token that covers the required range but is not larger than the desired range.

Two algorithms need to be specified: (1) how to compute the desired and required range for each operation; this is on the requesting side; (2) how to compute the granted range; this is on nodes which hold conflicting tokens.

For the above algorithms, we differentiate between two file access patterns: random and sequential. With random accesses, the starting offset of the next operation cannot be predicted. Sequential operations are assumed to start where the previous operation finished. Each file may be open multiple times on each node, and each such instance may present a different access pattern.

We prefer the following algorithm. The main goal is to minimize token traffic.

When trying to lock a byte range, we first query the token manager and see if a compatible token exists on the node. The range that is probed is the minimum range that is required by the operation. If the token is available locally, it is locked and no further token activity takes place.

However, if the token is not available, then a token is requested. The required range is computed based on the offset and length of the file operation. The desired range is based of the access pattern of the file. If the file is accessed randomly, then the desired range will be equal to the required range, since there is probably no advantage in stealing tokens (that would probably not be needed) from other nodes. If, however, the file is accessed sequentially, the desired range starts from the required range's start, but ends at infinity (there's a special value to represent infinity). This is an attempt to minimize future token requests, since we can predict the future locks that will be needed.

When a node holds a token that conflicts with a request for a token on another node, it gets a revoke request. The request contains the requesting node's required and desired ranges. Here, the node has to make a decision what range it can relinquish. If the required range is equal to the desired range, the decision is easy, and the granted range is the required (and desired) range. However, if the desired range is different than the required range, that means that the requesting node is accessing the file sequentially, and it wishes to have a token that starts at the required range's start but ends at infinity. The node then makes a pass over all its active processes that access the file, and checks whether they access the file sequentially or randomly. If all of them access the file randomly, then the node grants the desired range. However, if one or more of the processes access the file sequentially, it would be a waste to relinquish the desired range, since with high probability, we know what token will be requested soon. In this case, the file pointers (i.e., the anticipated location of the next operation) of all the sequential operations are examined, and the minimum offset is calculated. It is anticipated that these operations will not access file regions which are below this minimum since they are sequential. Thus, the granted range is stretched to that calculated minimum if it is higher than the required range.

We are not aware of a system where byte range tokens are requested based on the file's access pattern.

The solution allows caching of tokens with regard to the file access pattern. This saves acquisition of tokens which is a costly operation and thus improves the overall performance of the system.

Any parallel processing system which has the need to allow parallel write sharing of files and needs to serialize accesses to the same regions in the file.

Byte Range Token Interface

This parallel write improvement provides for the management of information describing tokens using a byte range lock algorithm with a byte range token interface. Our parallel file system where all disks that make up the file system can independently be accessed by multiple processors when exploited requires that a file should be shared by multiple processors for both reading and writing. To enable parallel write operation while ensuring file consistency, a locking mechanism for regions in files is required. In a distributed environment, tokens are sometimes used. This token represents the access rights of a node to an object. However, a node might run several processes which try to access the same region of a file; thus, a local lock mechanism is needed on the tokens. In addition, another node might need to access the same region and thus may try to revoke the token from this node; thus, a revoke should not proceed as long as a local process locks the token. Thus, some kind of locking algorithms should be used for these tokens, which are managed by our Token Manager (TM), which is our improvement over U.S. Pat. No. 5,343,108 assigned to International Business Machines Corporation.

To get access to a region in a file, a node first has to get the appropriate token, then lock it, perform the operation, and unlock the token. There are several problems associated with locking the tokens; first, a token may already be cached in the node. In this case we do not need to acquire it again. Second, we must ensure that locks within the same node do not conflict; third, we must handle revoke requests from other nodes that need a token that conflicts with a token that we currently hold. Our locking algorithm presented here solves these problems effeciently.

Our locking algorithm is presented as a set of APIs. Two APIs are used for locking and unlocking a byte range. A third API is a callback function called by the Token Manager. The Token Manager is assumed to provide three APIs as well. One API is needed to acquire a byte range token ("Acquire"). A second API is needed to test whether a byte range token is already cached in the node ("Test"). A third API is needed when relinguishing token as a response of a revoke ("Relinquish"). For the purpose of accessing regions in files, each token contains a range (start, end) of the region of the file which it can access.

We now elaborate on the Token Manager APIs which are an assumption. An acquire function of the form Acquire(byte_range)

which is called to acquire a range token

And a revoke callback function of the form

Revoke(byte_range)

which the TM calls whenever another node needs that token. As a result, the node should call Relinquish(byte_range)

The algorithm that we implemented is also based on a fourth interface that has to be provided by the TM:

Test(byte_range)

which queries the TM for the existence of the token on the node.

To simplify the implementation, we do not keep track of the tokens that we hold; we leave that to the token manager, and we use the Test interface to query whether a token needs to be acquired. Usually, there are actions to be performed when a token is acquired. Thus, it is desirable to know if a token is already held so that these actions may be spared.

The algorithm is based on a lock table (Range Lock Table, or RLT), which holds all the existing locks. The table is protected by a mutex to enable atomic insertions and deletions of locks. Three main functions are exposed: LOCK, which locks a byte range; UNLOCK, which unlocks a previously locked range; and REVOKE, which handles a revoke request.

We present the pseudo code for these interfaces:

```
LOCK(range)
{
retry:
   old_revokes = nrevokes;
   if (not Test(byte_range)) {
      // the token does not exist on this node
      acquire_mutex;
      i_am_fetching = true;
      fetch_is_pending = true;
      release_mutex;
      Acquire(byte_range);
      get_data_associated_with byte_range;
      goto retry;
   } else {
      // we have the token locally - check that it was
not stolen
      acquire_mutex;
      if (old_revokes != nrevokes)
         release_mutex;
         goto retry;
      }
      // make sure there are no pending acquires; if
there are
      // make sure they are finished first
      if (not i_am_fetching) {
         if (fetch_is_pending) {
            sleep();
            goto retry;
         }
      }
      // if we acquired the token before the Test, we
need to
      // release other threads. we hold the mutex, so no
revokes
      // can interfere here
      if (i_am_fetching) {
         i_am_fetching = false;
         fetch_is_pending = false;
         wakeup();
      }
   }
   err = insert_range_into_lock_table;
   if (err == E_CONFLICT) {
      sleep(); // wait for someone to release the lock
      goto retry;
   }
exit:
   if (i_am_fetching) {
      fetch_is_pending = false;
      i_am_fetching = false;
   }
   release_mutex;
}
UNLOCK(range)
{
   acquire_mutex;
   delete_range_from_lock_table;
   wakeup;
   release_mutex;
}
REVOKE(range)
{
retry:
   acquire_mutex;
   err = insert_range_into_lock_table;
   if (err == E_CONFLICT) {
      sleep()
      goto retry;
   nrevokes++;
   release_mutex;
   put_data_associated_with_byte_range;
   Relinquish(range);
   acquire_mutex;
   delete_range_from_lock_table;
   wakeup;
   release_mutex;
}
```

We have thus described a byte range lock. While we are not aware of any algorithms for byte range locks, we would note that previous solutions for non-byte range locks would keep a copy of the token states outside of the token manager.

Here we would remark that our distributed token manager provides interfaces (Acquire, Revoke, Relinquish, and Test) for the locking of ranges (i.e., byte ranges of a file). A given range can be requested in either shared-read or an exclusive-write mode.

One of the features of our invention is that we examine a token request for a specified byte range for comparing the request with the existing conflicting ranges in the entire multinode system and granting the largest possible byte range which does not require a token revoke from another computer. This reduces the probability that the next operation on the requesting node would require another token request. Counters and non-blocking lock calls are used to acquire tokens while holding other locks. This technique allows more efficient serialization for multiple requests within a single node allowing the required multiple node serialization.

So we provide that the Acquire interface of the token manager takes as input a mode, as well as two ranges, a "required" range and a "desired" range. The desired range must be a superset of the required range. An application calling the Acquire interface is guaranteed that, at a minimum, it will be granted the required range. The token manager will determine if any conflicting ranges (i.e., ranges that overlap the required range in a conflicting mode) have been granted to other nodes. If any conflicting ranges are found, then the token manager will request that each node that has a conflicting range downgrade the overlapping range to a non-conflicting mode.

We further provide that when any conflicts with the required range have been resolved, the Acquire interface will determine the largest, contiguous range which totally covers the required range, which is also a subset of the desired range. This is the range which the Acquire interface will return to the calling application. In effect, the token manager will grant the largest range possible (bounded by the desired range parameter) that does not require additional revoke processing to be performed.

The Revoke interface of the token manager is used to communicate to an application information about a conflicting range request from another node. When an Acquire request detects conflicting ranges that have been granted to other nodes, it will request that the application running on each of the conflicting nodes downgrade the ranges that they've been granted The information passed through the Revoke interface includes the mode, as well as the required/desired ranges that were specified on the Acquire call.

Upon receipt of a revoke request, an application will invoke the Relinquish interface to downgrade any conflicting ranges it has been granted to a non-conflicting mode. At a minimum, the application is required to downgrade any ranges that conflict with the "required" range to a non-conflicting mode, but may downgrade a larger range if it desires.

The token manager also provides a Test interface that will determine if a given range has been granted to the local node. This can be used by an application to determine if an Acquire request for a given range will require a communication request to the token server node.

By processing with the use of sequence numbers for a given byte range, we provide correct processing of acquires and revokes on the same byte ranges. The token manager Acquire interface takes as an argument, a sequence number. For each token, the token manager maintains a sequence number for each node that has been granted a range. The token manager updates the field containing a nodes sequence number at the completion of an Acquire operation with the value specified in the Acquire interface. When a subsequent Acquire must revoke ranges from conflicting nodes, the token manager will pass the sequence number of the last successful acquire from that node via the token manager Revoke interface.

In view of the interfaces to the distributed token manager (Acquire, Revoke, Relinquish, Test), we have provided an improved method for implementing local byte range locks in the code used. Several potential complications are elegantly solved by these program methods or algorithms, while enabling some sophisticated features:

We process multiple token acquires and revokes in parallel using the locking techniques described below with the pseudo code in the original disclosure. We allow for several token acquires to be processed in parallel. This can happen, for example, if several file system operations try to access different sections of a file in parallel.

And we allow for a token revoke for one part of a file to happen concurrently with an acquire, as long as the two do not conflict.

It will be appreciated that we do not need to keep a copy of the local token state within the byte range lock code.

We eliminate a livelock situation where, just after it is acquired, but before it is locked, a token is revoked by another node. The other node acquires the token and before being locked, it is stolen again. This ping-pong effect stops progress.

Now, a result of our not needing to keep a copy of the local token state within the byte range lock code is a reduction of the memory needs of our program since this information is already stored in the TM. An API queries the TM to find out if the token is already cached. After locking the byte range, a special mechanism is provided to make sure that a revoke didn't happen after testing for token existance but before locking it. It is possible that the token was revoked in between, In this case we acquire the token and try again.

The same byte range lock code that is used by the file system operations is also used by the revoke callback function. However, a special flag signified that this is a lock-for-revoke. This makes the code more compact and allows the use of the same lock tables.

The API for locking a byte range supports various options that enhance its operation:Non-blocking; Local-lock; Test; and Sequential. The non-blocking option allows for a non-blocking operation; if we don't have the token or a conflicting lock is being held, the lock code returns immediately with an appropriate return code.

The local-lock option allows for a non-distributed operation; if we do not need to lock globally but only within the node, we can use this option.

The test option allows seeing if we could lock the byte range, but without really locking.

The sequential option provinces a hire that we lock a byte range for reading (or writing) a file that is accessed sequentially. This hint is used if a token is needed. In this case, a token than is larger that the one which is really needed is desired (but not required).

Special provisions are made for keeping track of the various locks that are held by the threads. A debugging utility dumps the existing byte range locks ant the thread numbers that are holding them. Also, statistics are kept for understanding the patterns of file access and lock behavior.

By returning a handle for each successful lock operation, an unlock operation is speedy and does not require a search or a lookup.

By keeping counters of the various existing lock modes, the operation which checks if a conflicting lock exists is fast. For example, if we keep a counter for the number of active shared-read locks and active exclusive-write locks, we can often know if we need to check for range overlap. For example, if there are no exclusive-write locks and we need a shared-read lock, we know that there is no conflict, and we just need to find an empty slot in the lock table.

The lock code provides support for an unlimited number of byte range lock requests. In case the lock table gets full or a conflicting lock is requested, the thread that is asking for the look is put to sleep and is woken up when a lock is unlocked.

Our solution does not duplicate token information and thus, is compact and efficient.

Recovery in a Token Manager Environment

The complications of the parallel file system are enormous with multiple processors reading and writing to various parts of the file system at any instance. What happens when something fails in this environment may be asked. We provide for recovery in this environment. The first recovery mechanism relates to whet happens when a node fails and the metadata is being updated at the time of the failure. It describes a technique involving recovery of token state, replay of metadata logs and rigid ordering of operations.

Parallel File System Recovery Model

Our recovery model is applicable to our shared disk file system. The disks are attached either through multiple disk cables (e.g., scsi or ssa) or through a form of network attached storage. Each processor has independent access to the disk and data/metadata consistency is maintained through the use of a distributed lock manager. Metadata updates are logged independently by each processor to avoid the need for a file system scan on failure.

The difficult problem is that processors can fail (either software or hardware). These failures can take the form of an actual catastrophic loss of the processor or the loss of communications capability to participate in the lock management protocol. During these failures, the failing processor may hold locks allowing it to modify certain areas of the shared disk. Depending on the topology of the lock manager, it may even be able to acquire additional locks. The failing processor will eventually realize its condition, but the time to do this is not knowable externally since it depends on what is going on in the failed processor.

The objective is to allow all surviving processes to execute safely using the shared disk and to allow the failed processor to also provide support for using applications as soon as it can return to a known state.

Our recovery model implements the following concepts:

A group monitoring service(like Phoenix group services) that monitors processes on all of the processors and detects processor and communication failures. This service is provided by joining "process groups"; all members of a group are informed when a member fails or when a new process attempts to join a group. During the start time processors must join the "process groups".

Distributed locking. All disk access is coordinated among group members through distributed locking:
A member must obtain lock before reading or changing a particular piece of data/metadata on a shared disk.
One group member is a lock coordinator; the lock coordinator knows which locks could be held on which node.

Quorum. During startup and when there are communication failures, it is possible that more than one group forms. This could lead to lock coordinators in different groups making conflicting locking decisions. To prevent this no file system operations will be permitted if less than a majority of the processors capable of accessing the disk are a member of a "process group".

Logging. All data/metadata updates that could result in inconsistencies after a failure are logged. Each processor has its own log, but logs are stored on shared disk so they are accessible to all nodes in case of a failure.

Fencing. There must be a capability to block access from a given processor to a given disk.

Barriers. Since the recovery steps are inherently sequential, and requires certain recovery steps to be executed on all nodes, "barriers" are used to ensure that a step is completed on all nodes before executing the next step anywhere.

Our recovery model handles node failures without hardware locking. Each instance of the file system only operates when it is able to be an active member of a "process group". When the failure of a processor is detected, which can represent an actual processor failure or an inability to communicate its wellness, all the remaining group members are informed by the group monitoring service. The recovery of the failed processor is done by executing the recovery steps described below using a barrier synchronization protocol among the surviving group members. Since some of the recovery steps are done on one processor, a file system coordinator is elected to do these steps.

All surviving processors terminate communication to the failed processor.

The file system coordinator fences the failed processor. This causes the disk subsystem to cease to honor disk requests from the failed processor. The failed processor won't be able to access the shared disks, even if it has not yet detected the communication failure.

The next barrier is the recovery of lock state if necessary. The file system coordinator informs the lock coordinator. The lock coordinator suspends granting locks that are held by the failed processor at the time of failure. This prevents other nodes from accessing data that may have been left in a inconsistent state by the failed node. If the failed processor was the lock coordinator, the new lock state is calculated by an alternate coordinator by collecting the cached lock state information from the surviving processors. If this stage was not necessary, normal file system operations for data not covered by the suspended locks may resume on the surviving nodes.

The third barrier is the replay of the log of the failed node by the file system coordinator. This replay is done knowing that the failed processor is fenced from the disks, and the surviving processors will not grant locks that are blocked. At the completion of this step, the data on the disk will be consistent, and the locks may be released. Release from this barrier implies successful recovery and normal operation can resume on all surviving processors.

Processor failures detected during recovery are handled by starting over from the beginning. The individual recovery steps are implemented in such a way that they are independent, so that it doesn't hurt if they are executed multiple times until the recovery protocol completes without additional failures.

The above recovery steps describe recovery for one file system, and if there is more than one file system mounted, then all of the recovery actions in each step are applied to all file systems.

For handling node recovery the failed processor will attempt to rejoin the group as soon as it is able. If the failure recovery is still in progress, it won't be able to join the "process group" until the failure recovery protocol has completed. There are two paths possible, either the failed node is joining an existing group or it is joining a group waiting for a quorum. If it is joining a group waiting for a quorum, log replay will occur as soon as a quorum exists (it is then known that non-conflicting locks exist). If it is joining an existing group, it will unfence itself and allow normal file system operations.

The second of the recovery features handles the intersection of recovery and the requirement for metadata nodes. The metadata nodes maintain state that needs to be preserved across a failure.

Synchronous and Asynchronous Takeover of Metadata Node

Our parallel file system works where all disks that make up the file system are distributed on a communications network, as in a TCP/IP network or on a switch which allows multiple processors to interact, is in a massively parallel machine or cluster, and so a file needs to be and can independently be accessed by multiple processors. To exploit this capability, a file should be shared by multiple processors for both reading and writing.

Write-sharing of files in a distributed file system presents several problems. One of them is access and update of metadata we have provided. Our metadata node is a mechanism to control metadata in a distributed file system. Every node which accesses a file needs to read or write metadata information to the metadata node (or metanode).

The metadata node keeps the information about the file's metadata and acts as a smart cache as described in the section Buffer Management with improved cache performance, usage of metadata node, using tokens, and Smart caching of byte range tokens using file access patterns for nodes a smart cache between the disk and all the nodes that access the file. There are situations when the metadata node (or metanode) ceases to serve this function. In order to enable smooth operation and recovery, these situations need to be handled. Nodes that used to access the metanode need to elect a new metanode in a straightforward way.

We hereby describe the situation that can trigger a metadata takeover and the method that we chose in order to enable a takeover.

There are three situations when a metanode ceases to operate as a metanode; the first two are asynchronous, i.e., other nodes are not aware of this immediately. The third one is synchronous, i.e., all the nodes are aware of the takeover.

1. The metanode fails (crashes);
2. The metanode closes the file or flushes it from its cache;
3. Another node needs to become the metanode.

In all these cases, we need to assure that a reliable takeover takes place. In asynchronous operations, the first node that tries to access the old metanode detects an error; either the node crashed, in which case is gets a communication error, or the old node decided not to be the metanode any more, in which case the node gets an appropriate error from the old metanode. In both these cases, the node tries to become a metanode by requesting an appropriate token from the TM. If there is no other metanode (which is the case if it was the first to access the old metanode), the node will become the new metanode. Other nodes that subsequently try to access the old metanode will also go through the same process, but will fail to acquire the appropriate token. A query to the Token Manager will reveal the new metanode. Thus, every node eventually finds out either that it has become the new metanode or that the metanode has changed. In either case, appropriate actions are taken. If a node became a metanode, it reads the most recent metadata from disk. If a node's metanode changed, The node will re-send its own metadata updates to the new metanode since it is possible that the old metanode failed before flushing these updates to disk. By using a version number for each such update, every node knows which updates are on disk and which have to be re-sent to the new metanode.

Since a node might crash while trying to become a metanode, every operation that involves the access to the metanode has the following skeleton:

TABLE 7

```
retry:
if (I_am_metanode) then
    DO this_and_that
else {
    err1 = send_message_to_the_metanode; // so the metanode will do
                                          // " this_and_that"
    if (err1 == METANODE_IS_DEAD || err1 ==
    METANODE_NOT_ANY_MORE) {
        err2 = try_to_become_metanode;
        if (err2 == OK) then // we became the metanode
            read_metadata_from_disk (and other stuff to do when
                becoming a metanode)
        else // someone else became the metanode
            // find_out_the_new_metanode,
            and_send_it_information_that_is_not_yet_on_disk
            // metanode has changed; in both cases, retry the original
            // operation
    }
    goto retry
}
```

END TABLE

Our described system for a dynamic takeover of metanodes is unique, and our particular solution has the advantage that it exploits a subsystem which has other uses (the Token Manager) for selecting a new metanode based on file activity. Since all operations involve an inherent "retry" mechanism, and since every node can act as a metanode, a metanode will eventually be elected, and we are thus assured that a takeover will eventually and dynamically take place.

The information kept in every node assures that even if a metanode fails, the recovery process will reconstruct all information such that a consistent view of the file is available.

Allocation of Quotas

Next, we will discuss our improvements involving the allocation of quotas in this shared disk file system. The basic difficulty is that quotas must be strictly maintained across a set of nodes. While one could think of them as being maintained at a central server, we have found that this is not a feasible solution because the central server would become a bottleneck as each new write of data would need to ask this single server for permission before writing the data. Here we will describe our method for allocating shares of quota to computers which are actively writing to a file system on behalf of a quota holding user. Later we deal with ways of recovering such a share in the event of a failure.

In a parallel file system where all disks that make up the file system can independently be accessed by multiple processors to actively read and write to the files on various disks, a number of sectors of a disk must be assigned to files on each processor creating files. The sectors allocated to files owned by a specific user are limited by a quota which specifies how much disk space this user or group of users is allowed to use. The problem is that users may be executing on multiple processors concurrently and charging the same quota. Centralizing the allocation of new disk blocks slows down visage of our massively parallel processing system.

We have implemented a system which allocates shares of the quota to each node, reallocates it based on demand, and recovers it across failures. Our solution is a method for the management of inode and disk block quotas per file system in a massively parallel computing environment or other environment of multiple computers which we are describing. The work is divided between one quota server per file system and a quota client per node per file system that is actively working on data within the file system.

A quota limit is a threshold up to which a user is allowed to allocate inodes or file system space. In this paper, the number of inodes and the amount of space allowed to a user will be called a quota. A local share is the amount of space that can he allocated on behalf of a user on a quota client without interaction with the quota server.

The server maintains a disk resident file that contains the quota limits and the accumulated usage for all users in the entire MPP system. This is only available on the server which performs all read and updates for this file for all processors. Thus, only the server has a total view of the usage of quotas and the allocation that is still available.

All actions related to the overall quota management are executed on the quota server. Changes in limits, allocation of local share, and display of current status require interaction with the quota server. Quota clients make changes in the file system allocations as allowed by their local share and update the server periodically based on their usage of this share. The server may revoke share from the client to satisfy requests for share from another client.

Quota clients start with zero local share. Only if an application on the processor tries to create new file system data will a local share for the user be requested. Only if the client receives an adequate local share will the the application request be satisfied; otherwise the application request is not honored. The quota client maintains a record of the local share and how much of that share has been used. Applications that release disk space will increase the local share for the user. The quota client will periodically update the quota server on its usage and will release excess quota share based on application usage patterns.

The quota server gives out local shares as long as it still has quota available, i.e., the system wide quota limit is not exceeded. If all of the quota limit has been given as local shares, the quota server will revoke local shares to satisfy new requests. This will be done by revoking part of the local shares allowing the client to continue using the remaining share. These requests will become stronger revoking larger portions of local shared until no guota is available to satisfy requests causing application requests to be denied.

The difficulty with this method is that it must provide for failures of both clients and servers. Clients may fail with local shares that are partially used, and the server may fail concurrently with a client failure. The user must never be allowed to exceed the quota allocated and also may expect to be able to get this amount of space. This requires use of the "in-doubt" method of quota allocation. Each time that the quota server allocates a local share, a record is placed on a recoverable disk of the sum of the local shares, the "in-doubt value". This represents the amount of quota space that the server does not have exact information about. In-doubt space may not be reallocated without a danger of allowing a user to exceed his limits. The in-doubt values are undated by periodic messages from the clients showing their usage of the local share. This space moves from in-doubt to used. Space which is relinquished by a client is also decremented from the in-doubt value. The overall allocation available to a user is his allocation minus that known to be used minus that which is in-doubt. All modifications to the in-doubt value are forced to disk immediately to handle recovery.

If a client fails, the amount of storage which is in-doubt is not available to a user until a "quota check" utility program is run which validates the actual usage of storage by this user. Some part of the in-doubt value represents actual usage by the user, but some represents potential usage which is temporarily lost. The algorithm for allocating shares is sensitive to the usage of new disk storage at the client and attempts to give the client what it will use soon for performance reasons and to limit excess local share for recovery reasons. This method allows continued operation of the user against the portion of his quota which is not in-doubt until the quota check utility is run. It also allows parallel allocation of disk blocks for performance.

When the quota server fails, a new quota server will be chosen. It will not have any information of changes that have not yet been written to disk. It will generate this information by revoking all local shares and updating in-doubt values based on the replies. Note that client failures concurrent with the server failure will result; in lost blocks until the quota check utility is run. This algorithm allows quota enforcement to be done correctly for non in-doubt allocations quickly after a failure.

We are aware of no parallel file system that allocates disk blocks independently on all the nodes of a parallel system. This means that no one else will face the problem until they try network attached storage systems.

We allocated storage in parallel for performance reasons. Any allocation server solution would have bottlenecks and recovery problems. We must have quota because users wish to control the usage of disk storage across the entire parallel processing system. The solution allows parallel allocation, does not force continual locking of a global quota which would be slow, and provides for recovery of processing failures in a timely fashion.

Any parallel processing system using a shared disk model of connection of disks can make use of this development.
Recovery of Local Shares for Quota Management in Parallel Processing This section describes the operation of our quota check utility in this environment. The functions of quota checking are similar to Quotachk which is a standard Utility for fixing quota files after a failure in a Unix operating environment, but Quotachk does not run with multiple nodes sharing quotas, as described in the previous invention. Our development allows running of a "Quotachk" without shutting down all computers accessing the data.

This section describes a utility/method that recovers shares when after a failure, it is not known whether they are used/allocated or still available. The utility works without disrupting users from allocating or deallocating disk space in the file system.

For the management of inode and disk block quotas per file system in a massively parallel computing environment, the work is divided between one quota server per file system and a quota client per node per file system that is actively working on data within the file system.

A quota limit is a threshold up to which a user is allowed to allocate inodes or file system space. In this paper, the number of inodes and the amount of space allowed to a user will be called a quota. A local share is the amount of space that can be allocated on behalf of a user on a quota client without interaction with the quota server.

The server maintains a disk resident file which contains the quota limits, the accumulated usage, and the "in-doubt value" for all users in the entire MPP system. The "in-doubt" represents the amount of quota space that the server does not have exact information about. In-doubt space may not be reallocated without a danger of allowing a user to exceed his limits. Some part of the in-doubt value represents actual usage by the user, but some represents potential usage which is temporarily lost.

The solution described here is a method to recover local shares from the "in doubt", so that the unused, temporarily lost quota become available again. This mechanism (called quotacheck hereafter) works on an active file system without disrupting allocation and deallocation of disk space and inodes.

Quotacheck creates on the quota server a shadow copy of all quota records and accumulates there the quota usage found in the files inode information. While quotacheck is scanning through the nodes, all changes in allocations and deallocations are moved in the original quota record and in the shadow record at the quota server. Quota usage updates before and after the current quotacheck position (i.e., the currently read inode) must be treated differently. Allocation changes after the current quotacheck position (already checked inodes) are updated in the original quota record and in the shadow record; allocation changes before the current quotacheck position (not yet checked anodes) are updated in the original quota record only. The "in-doubt value" in both records is updated equally, so the the sum of local shares on quota clients is correct after quotacheck finished.

The quota clients are informed about the current quotacheck position and are thus able to collect in shadow entries all those quotas that are allocated or deallocated behind the respective current quotacheck position. Quota clients will send their collected changes for the shadow quota record to the quota server when quotacheck finishes scanning through the inodes and starts merging the original and the shadow quota entries.

The "in-doubt" value of the shadow record is updated together with the "in doubt" value of the original quota record at the server after all shadow records are created and after all local shares are revoked from the clients, but before quotacheck starts scanning inodes for quota usage information (i.e., the shadow "in-doubt" starts with zero, and the regular "in-doubt" displays the lost quotas). When merging shadow and regular quota records at the end of quotacheck, the shadow record's "in-doubt" value is copied to the regular quota record.

We are aware of no parallel file system that allocates disk blocks independently on all the nodes of a parallel system. This means that no one else will face the problem until they try network attached storage systems.

We allocate storage in parallel for performance reasons and avoid a single server solution which has bottlenecks and recovery problems. We must have quota because users wish to control the usage of disk storage across the entire parallel processing system. The solution allows parallel allocation, does not force continual locking of a global quota which would be slow, and provides for recovery of processing failures in a timely fashion.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. In a system employing a file system for storing file data and having a file structure that includes metadata, a method comprising:

providing a parallel file system for multiple servers of the file system with a file structure residing on one or more disks directly accessible by multiple separate peer computer nodes, said file system allowing a computation that uses the file structure to be broken up into multiple pieces that can be run in parallel on separate computer nodes allowing users to login to any node of said multiple separate peer computer nodes which share in the management of the file system and to access multiple disks in the system which are directly attached to different server nodes, said file system managing sets of disks which hold data and metadata allowing said multiple separate peer computer nodes to share in the management of the file system without assignment of the files system management to a single computer node with disks containing the data and metadata being attached to different ones of the multiple peer computer nodes in a manner that makes the disks appear to be locally attached to each file system even though directly attached to a separate peer computer node and to appear the same for all instances of the file system, and allocating files with said multiple separate peer computer nodes in an allocation map which is part of said file structure which is stored as part of metadata for said file structure, wherein said allocation map is subdivided into a number of regions, whereby by using distinct regions said multiple separate peer computer nodes simultaneously allocate striped files in parallel without interfering with each other.

2. In a system employing a file system according to claim 1, wherein said file system locks regions to synchronize access to the allocation map.

3. In a system employing a file system according to claim 1, wherein said system is provided with a disk allocation for subdividing said allocation map into regions, and when said map is divided into K regions, each region controls 1/K of the blocks on each of N disks of the file system.

4. In a system employing a file system according to claim 3, wherein said allocation map may use the same block size as a regular file, and wherein said regions are composed of one or more disk segments, where each segment is at most the size of an allocation block and controls allocation of blocks on a subset of said N disks, and wherein if regions are less than half the size of map blocks, multiple regions are packed into each map block.

5. In a system employing a file system according to claim 1, wherein in the allocation of map regions, the number of regions is selected to be at least as large as the number of file system nodes, so that each node can be allocate from a different region.

6. In a system employing a file system according to claim 1, wherein the first segment of each region is stored at the beginning of the allocation map, followed by a second segment of each region, and the file system can be extended by adding more disks without reorganization of tie allocation map, and wherein additional segments are appended to the end of an existing allocation map.

7. In a system employing a file system according to claim 1, wherein said file system provides a token resource, and for allocation of successive blocks of a striped file, a node obtains a token for a region and allocates successive blocks according to a striping permutation using free blocks whose allocation map elements indicate their state is free in the region for which said node obtains a token.

8. In a system employing a file system according to claim 1, wherein there is included an allocation manager program for tracking nodes using an allocation region, and for tracking the free space remaining in each region.

9. In a system employing a file system according to claim 8, further including a step for directing block deallocation to each node that is using a region controlling the block being allocated with said allocation manager and file system.

10. In a system employing a file system for storing file data and having a file structure that includes metadata, a method comprising:

provide a file system with a file structure residing on one or more disks accessible by multiple separate computer nodes, said file system allowing a computation that uses the file structure to be broken up into multiple pieces that can be run in parallel on separate computer nodes, and allocating with multiple separate computer nodes in an allocation map which is part of said file structure which is stored as part of metadata for said file structure, wherein said allocation map is subdivided into a number of regions, whereby by using distinct regions said multiple separate computer nodes simultaneously allocate striped files without interfering with each other; and wherein said allocation map may use the same block size as a regular file, and wherein said regions are composed of one or more disk segments, where each segment is at most the size of an allocation block and controls allocation of blocks on a subset of said N disks, and wherein if regions are less than half the size of map blocks, multiple regions are packed into each map block.

11. In a system employing a file system for storing file data and having a file structure that includes metadata, a method comprising:

providing a file system with a file structure residing on one or more disks accessible by multiple separate computer nodes, said file system allowing a computation that uses the file structure to be broken up into multiple pieces that can be run in parallel on separate computer nodes, and allocating with multiple separate computer nodes in an allocation map which is part of said file structure which is stored as part of metadata for said file structure, wherein said allocation map is subdivided into a number of regions, whereby by using distinct regions said multiple separate computer nodes simultaneously allocate striped files without interfering with each other; and wherein the first segment of each region is stored at the beginning of the allocation map, followed by a second segment of each region, and the file system can be extended by adding more disks without reorganization of the allocation map, and wherein additional segments are appended to the end of an existing allocation map.

12. In a system employing a file system for storing file data and having a file structure that includes metadata, a method comprising:

providing a file system with a file structure residing on one or more disks accessible by multiple separate computer nodes, said file system allowing a computation that uses the file structure to be broken up into multiple pieces that can be run in parallel on separate computer nodes, and allocating with multiple separate computer nodes in an allocation map which is part of said file structure which is stored as part of metadata for said file structure, wherein said allocation map is subdivided into a number of regions, whereby by using distinct regions said multiple separate computer nodes simultaneously allocate striped files without interfering with each other; and wherein there is included an allocation manager program for tracking nodes using an allocation region, and for tracking the free space remaining in each region.

13. In a system employing a file system for storing file data and having a file structure that includes metadata, a method comprising:

providing a file system with a file structure residing on one or more disks accessible by multiple separate computer nodes, said file system allowing a computation that uses the file structure to be broken up into multiple pieces that can be run in parallel on separate computer nodes, and allocating with multiple separate computer nodes in an allocation map which is part of said file structure which is stored as part of metadata for said file structure, wherein said allocation map is subdivided into a number of regions, whereby by using distinct regions said multiple separate computer nodes simultaneously allocate striped files without interfering with each other; and wherein including a step for directing block deallocation to each node that is using a region controlling the block being allocated with said allocation manager and file system.

* * * * *

UNITED STATES PATENT AND TRADEMARK OFFICE
CERTIFICATE OF CORRECTION

PATENT NO. : 5,960,446
DATED : September 28, 1999
INVENTOR(S) : Schmuck et al.

It is certified that error appears in the above-identified patent and that said Letters Patent is hereby corrected as shown below:

In the abstract on line 12 replace "development" with --developments--.
On page 2, line 35 delete "what" and insert --What--.
On page 7, line 34 delete "and," and insert --, and--.
On page 20, line 55 after "prefetching" delete ",".
On page 20, line 60 after "4" delete ",".
On page 26, line 9 after "Otherwise" insert --,--.
On page 30, line 3 after "Hence" insert --,--.
On page 34, line 4 delete "defile" and insert --before--.
On page 38, after line 70 and before line 71 insert --}--.
On page 40, line 39 delete "existance" and insert --existence--.
On page 40, line 44 delete " signified" and insert -- signifies--.
On page 40, line 61 delete "that" and insert --than--.
On page 41, line 59 after "time" insert --,--.
On page 41, line 59 after "processors" delete ",".
On page 42, line 7 delete "a member" and insert --members--.
On page 43, line 5 after "recovery" insert --,--.
On page 43, line 40 delete "a smart cache".
On page 45, line 41 after "otherwise" insert --,--.
On page 48, line 57 delete "be".
On page 48, line 63 delete "tie" and insert --the--.

Signed and Sealed this

Twelfth Day of September, 2000

Attest:

Q. TODD DICKINSON

*Attesting Officer*  *Director of Patents and Trademarks*